US009047631B2

(12) United States Patent
Sridharan et al.

(10) Patent No.: US 9,047,631 B2
(45) Date of Patent: Jun. 2, 2015

(54) CUSTOMER ASSISTANCE PLATFORM

(71) Applicant: Sears Brands, L.L.C., Hoffman Estates, IL (US)

(72) Inventors: Bharath Sridharan, Schaumburg, IL (US); Jen Hao Yang, Schaumburg, IL (US); Gadi Lifshitz, Kiryat Ono (IL); Guy Ephraim, Tel Aviv (IL); Gilad Opher, Kibbutz (IL)

(73) Assignee: Sears Brands, L.L.C., Hoffman Estates, IL (US)

( * ) Notice: Subject to any disclaimer, the term of this patent is extended or adjusted under 35 U.S.C. 154(b) by 0 days.

(21) Appl. No.: 13/756,206

(22) Filed: Jan. 31, 2013

(65) Prior Publication Data
US 2013/0198039 A1 Aug. 1, 2013

Related U.S. Application Data

(63) Continuation-in-part of application No. 13/364,441, filed on Feb. 2, 2012, and a continuation-in-part of application No. 13/273,459, filed on Oct. 14, 2011.

(51) Int. Cl.
*H04W 24/00* (2009.01)
*G06Q 30/00* (2012.01)
(Continued)

(52) U.S. Cl.
CPC .......... *G06Q 30/0613* (2013.01); *G06Q 30/016* (2013.01); *H04M 3/523* (2013.01); *H04M 7/003* (2013.01)

(58) Field of Classification Search
CPC .. G06Q 30/016; G06Q 30/0613; H04W 4/02; H04W 64/00

USPC ........... 455/14.54, 14.71, 7.29, 14.58, 26.41, 455/10, 26, 7.19, 26.61, 456.2, 404.2, 455/456.3; 705/14.54, 14.71, 7.29, 14.58, 705/26.41, 10, 26, 7.19, 26.61
See application file for complete search history.

(56) References Cited

U.S. PATENT DOCUMENTS

2004/0203633 A1  10/2004  Knauerhase et al.
2005/0091123 A1  4/2005  Freishtat et al.
(Continued)

FOREIGN PATENT DOCUMENTS

WO  03084179 A1  10/2003

OTHER PUBLICATIONS

International Search Report and the Written Opinion of the International Searching Authority, or the Declaration, in International application No. PCT/US2013/023424, dated Apr. 2, 2013. (12 pages).
(Continued)

*Primary Examiner* — Opiribo Georgewill
(74) *Attorney, Agent, or Firm* — McAndrews, Held & Malloy, Ltd.

(57) ABSTRACT

A method and system for providing location based assistance. The method and system including hosting a database of information regarding a customer, hosting a database of information regarding sale associate availability, and receiving a customer assistance request. The system determines the location of the customer and determines the availability of at least one sale associate within a predetermined location threshold of the location of the customer to service the customer assistance request. The customer assistance request is then routed to the at least one sale associate within the predetermined location threshold of the location of the customer for assistance.

23 Claims, 16 Drawing Sheets

(51) Int. Cl.
  *G06Q 30/06* (2012.01)
  *H04M 3/523* (2006.01)
  *H04M 7/00* (2006.01)

(56) References Cited

U.S. PATENT DOCUMENTS

2005/0251440 A1  11/2005  Bednarek
2009/0216645 A1   8/2009  Oleen
2009/0261157 A1*  10/2009  Kumar et al. ............... 235/375
2010/0332283 A1  12/2010  Ng et al.
2011/0276382 A1  11/2011  Ramchandani et al.
2012/0203586 A1   8/2012  Blakely
2012/0296686 A1*  11/2012  Fugman et al. ............. 705/7.19
2013/0006789 A1*   1/2013  Fulkerson .................. 705/26.1

OTHER PUBLICATIONS

Extended European Search Report for Appln. No. 14 153 301.8 dated Jun. 3, 2014 (6 pages).

* cited by examiner

CUSTOMER ASSISTANCE PLATFORM

CROSS-REFERENCE TO RELATED APPLICATIONS

The present application is a continuation-in-part of U.S. patent application Ser. No. 13/364,441 filed Feb. 2, 2012, and of U.S. patent application Ser. No. 13/273,459 filed Oct. 14, 2011, each of which is hereby incorporated herein by reference, in its respective entirety.

FIELD OF THE DISCLOSURE

The present description relates generally to personalized customer service, and more particularly to methods and systems for providing assistance to customers from the most relevant source via any of a variety of different communications mechanisms.

BACKGROUND OF RELATED ART

In-store customer service has been previously provided by a sales associate. For instance, in a traditional situation, a customer enters a retail establishment and proceeds to browse and/or purchase items. The customer may have no preconceived notion of what they wish to buy and may utilize in-store assistance and/or advice to make a purchase. In still other situations, the customer may have an idea of the purchase they wish to make, and yet may still rely upon in-store assistance to make additional and/or other purchases based upon any number of factors including the associate's recommendations, sales, advice, etc.

In a traditional online setting, a customer visiting an online store front receives little or no assistance regarding their shopping experience. Thus, in order to enhance the online experience, some online retailers have begun to provide additional enhancements to their shopping experience. For example, some websites provide customers with sales ranking, similar sales, online reviews, textual chats, etc. to assist an online customer in making purchase decisions.

In an offline environment, however, customers traditionally lack buying support other than a traditional in-store assistant. For example, in a typical retail environment, buying support may be provided by multiple actors, such as, for example, floor associates, previously researched reviews and/or product information, and other shoppers present at the same location.

While the background systems and methods identified herein, generally work for their intended purpose, the subject invention provides improvements thereto, particularly by providing a customer with a mobile application that enables a customer to find and communicate with various types of people such as sales associates, social connections, etc., in real time or near real time based upon a customer location and/or a identification of what the customer is looking for.

BRIEF DESCRIPTION OF THE DRAWINGS

For a better understanding of the present disclosure, reference may be had to various examples shown in the attached drawings.

FIG. 6 illustrates an example user interface for placing a service center call request with the example service call system in accordance with the present disclosure.

DETAILED DESCRIPTION

Figure 1:
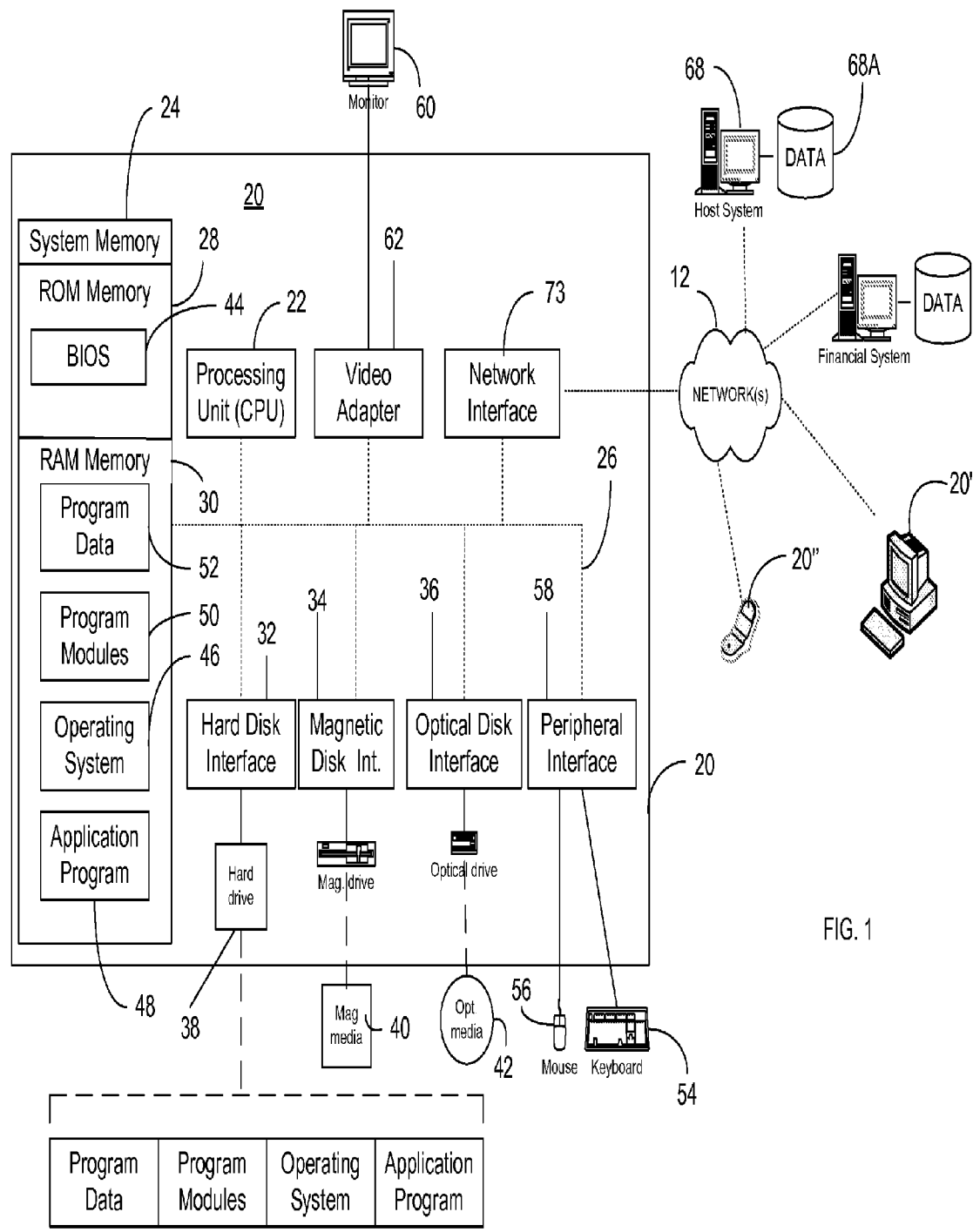
FIG. 1 illustrates in block diagram form components of an example, computer network environment suitable for implementing the example service call systems disclosed.

The following description of example methods and apparatus is not intended to limit the scope of the description to the precise form or forms detailed herein. Instead the following description is intended to be illustrative so that others may follow its teachings.

A customer assistance application is explained hereinbelow. In general, the application identifies a customer location and allows the customer to share and/or specify product purchase needs/wants to receive assistance regarding their purchases. The customer location may be used for e-commerce, social media, retail, multichannel retail, mobile, and tablet enhancements as well as the gamification of a customer experience (e.g., funware). In one example, the application enables a customer seeking help to find and communicate with an in-store sales associate of a business or a partner retailer, friends, family members, personal shoppers, members of their social network, and call centers or customer care networks, based upon a number of factors including, for example, the customer location and/or purchase intentions. Another example of a representative embodiment of the present invention may be seen in a platform that enables customers of a social commerce ecosystem to get help from the most relevant channel at any point in their shopping experience. The term "channel" in the present context may refer to various means of communicating such as, for example, online communication (e.g., Internet-based), mobile communication (e.g., wireless communication such as cellular or Wi-Fi), and in-store. The system allows a one-to-one, one-to-many, and/or a many-to-many communication scheme, and may be in a number of different forms including, for example, voice calling, video calling, text messaging, email, voice mail, and messaging/signaling via a social network. The sales associate may be an expert, question and answer provider, merchandise associate, etc.

Still further, in another example, the application identifies a customer location and allows a third-party such as a sales associate, to proactively contact the application and thus provide further assistance to the customer. In each example, the assistance provided may be personalized to meet the customer's needs, such as for instance, personalized recommendations based upon information gleaned from rewards programs, search history, purchase history, social media interactions, friends' transactions, recommendations from personal shoppers, social coupons, shared coupons, likes, dislikes, and/or other personal data. The present customer assistance application provides additional customer service options as long as the customer has access to a communication device.

A representative embodiment of the present invention may act as a mediator between customers, the customer's social networks, and retailers, enabling a customer to obtain help from the most appropriate help network using the most convenient channel.

In related U.S. patent application Ser. No. 13/273,459, entitled "Systems and Methods For Providing A Distributed Mobile Call Center For A Service Establishment," filed Oct. 14, 2011, and incorporated herein by reference in its entirety, the inventors describe a system that provides a mobile application service call including service calls to associates within the retail/service establishment. In the disclosure the inventors provide for a system and method that are particularly well suited to a mobile application and that provide the ability for a customer to initiate a mobile video call to receive expert assistance as needed.

In the following discussion, the terms "customer service agent" and "sales associate" may be used herein interchangeably to refer to an employee that provides product and/or sales related assistance to customers of a business. The term "customer" may be used herein to refer to a potential or existing purchaser of products and/or services of a business. The term "personal shopper" may be used herein to refer to an individual that provides product information, recommendations, and/or purchase assistance to members of their own social network or others under the guidance and/or with the assistance of the operators of a commercial retail business.

As utilized herein, the terms "exemplary" or "example" means serving as a non-limiting example, instance, or illustration. As utilized herein, the term "e.g." introduces a list of one or more non-limiting examples, instances, or illustrations.

In one example, the system provides the use of commodity hardware, off the shelf software, OS independent applications, form factor independent devices (PC, tablets, smart phones etc), media independent (voice, text, video) and cloud based infrastructure to run all functionalities of the present system. In the context of a service establishment, such as, for example, a retail store this is specifically very useful as a customer can utilize familiar technologies and receive relate and personalized support, assistance, product demos, suggestions, etc., which can be handled by a sales floor associate who has the most expertise and relevant information and who are located proximate to the customer, and/or can be handled by the consumer's social network.

The disclosed methods and systems may be part of an overall shopping experience system created to enhance the consumer shopping event. In one example, the disclosed system is integrated with the customer's reward system, the customers social network (e.g., the customer can post their shopping activity conducted through the system to their social network), the customer's expert system, digital/mobile applications, shopping history, wish list, location, merchandise selections, or the like. It will be appreciated, however, by one of ordinary skill in the art that the system disclosed may be fully and/or partially integrated with any suitable shopping system as desired, including those not mentioned and/or later designed.

With reference to the figures, the following discloses various example systems and methods for providing in-store assistance and/or social network shopping on a computer network, such as a mobile device. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, consumer, etc., to access a host system server 68 and, among other things, be connected to a hosted social networking site, a user profile, and/or a sales associate. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet, e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, coordinating a social network storage of a shopping list, receiving a location of a customer via a mobile device, receiving a request for a service call center connection from either a customer or a sales associate, routing the request via a distributed mobile video call center, providing a service call infrastructure for providing the requestor with a distributed customer service experience, Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2A:
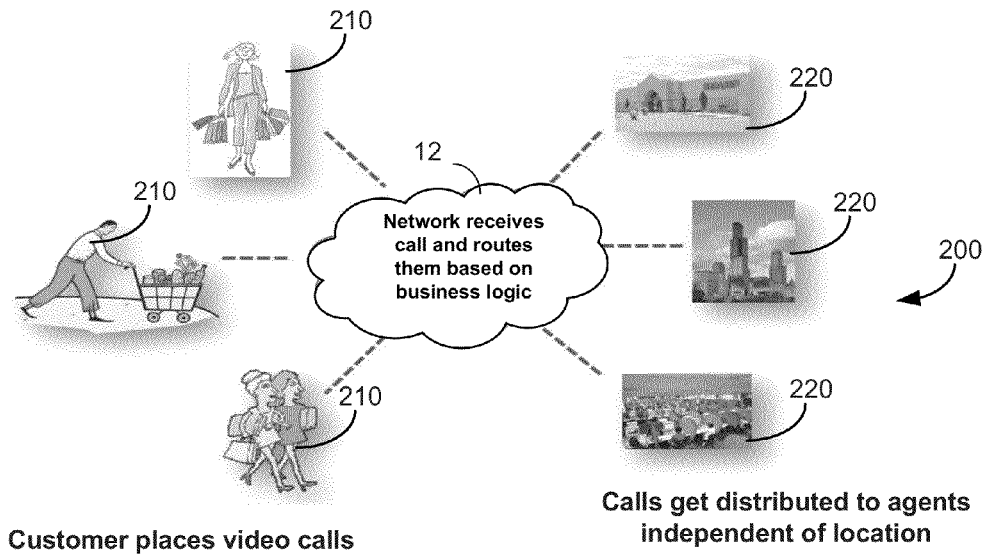
FIG. 2A illustrates an example service call system in accordance with the present disclosure.

Referring to FIG. 2A, there is illustrated an overview of an example call center distribution system 200 in accordance with an example of the present disclosure. The system 200 is well-suited for operation on a distributed network system, such as, for example, the Internet, cloud, mobile network, cellular network, or other suitable wired and/or wireless network. The system 200 may be implemented in various other communication networks and/or mediums as desired including, for example, a localized, non-distributed network.

Generally speaking, the system 200 is operable to facilitate a distributed service call between a customer and a service agent independent of the service agents physical connection with a traditional call center. For instance, in the illustrated example, a customer 210 (e.g., a user, consumer, shopper, etc.), having need of customer assistance, places a phone call, such as a video phone call, to a customer service server (e.g., the host system server 68) through any suitable network such as the network 12. In this example, the network 12 is coupled to the host system server 68 to distribute the call to one of a plurality of customer service agents 220 geographically distributed in independent locations.

In this example, the distributed customer service agent 220 can be any individual with access to a service center call device, such as a mobile service center call device. The agent may be located locally to the call initiator, or may be located anywhere remotely in the agent network. For example, the agent may be located in the same service establishment (e.g., retail sale) location as the caller, or may be at another sales location, such as an outlet, service department, call center, etc.

Figure 2B:
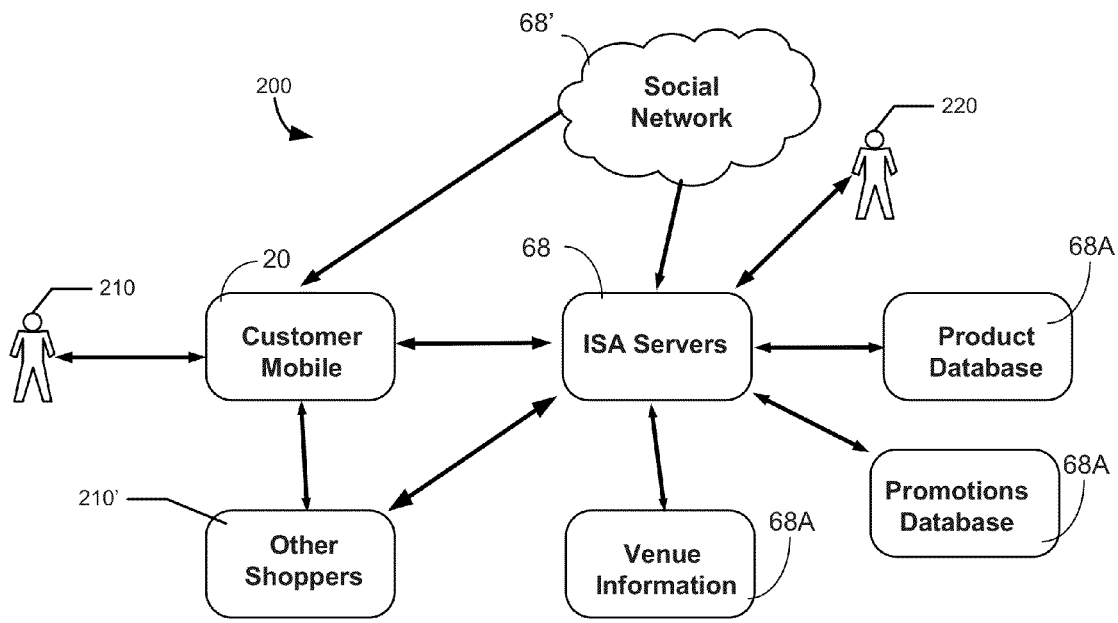
FIG. 2B illustrates an example system for providing in-store assistance via a mobile device.

Turning now to FIG. 2B, there is illustrated another example use of the distributed system 200 as described above. In this example, the system 200 creates a connection between the customer 210 and the customer service agent 220, between the customer 210 and another shopper 210', or between the customer 210 and the customer's social network. For example, in one instance, the customer 210 may provide the host system 12 with the customer's current location. This may be done through an automated means (e.g., automatic network location and/or GPS location, etc) or may be done manually through a "check-in" service. In an example "check-in" service, a user may proactively provide the server 68 with their location through any suitable means. This may be through the use of a specific button, service, and/or other suitable check-in on provided with the system 200 including an application specific check-in button on a mobile application provided with the device 20. The check-in may also occur through other means including scanning of specific codes, textual messages, emails, etc.

Once the customer 210 has registered their location with the sever 68, data relevant to the location and the shopping purpose may be utilized and/or otherwise provided to the sales associate 220. In this example, the server 68 may utilize data from a social network 68', which may be an external social network, or may be an internal social network provided by the host system server 68. The server may also utilize data regarding location and/or enterprise specific products inventory, new inventory, etc, data regarding promotions, and/or data regarding promotions, sales, etc, each of which may be stored in the data repository 68A. By utilizing data from any number of data repositories, the system 200 may present the sales associate with relevant data, thereby increasing the likelihood that the customer 210 will receive sufficient service.

Of course, it will be appreciated by one of ordinary skill in the art that the customer 210 may elect to provide as little or as much personal information as desired. For example, the customer 210 may elect to allow the system 200 to retrieve their current location, but may reject a request to receive data from the social network 68'. In at least one example, the customer 210 may be rewarded with various rewards including additional promotions, loyalty rewards, etc. Additionally, the customer's location and/or shopping intentions/purchases may be posted online in a social network setting, assuming the customer's privacy allows for such information to be provided.

By coordinating data exchanges between the host system server 68 and the sales associate 220, the system 200 allows for the customer 210 to announce and/or other indicate their specific purchase intents in order to receiver support either from their online (e.g., social network) community, or from the sales associate 220 (in-store, centrally located, etc). The system 200 may then provide the customer 210 with notifications (e.g., via email, video, text messages, etc) as soon as inventory matching their purchase intents are available at the customer's local locations, or can be obtained through distribution channels, regardless of the currently location of the customer 210. In this way, the sales associate may be able to monitor and/or otherwise service the customer 210 even if the customer is not in the physical retail establishment. Additionally, by understanding the customer's current location and allowing the customer 210 to check-in, the sales associate 220 and/or the system 200 may provide (e.g. push) the customer 210 with a summary of interesting and/or new inventory, advertisements, specials, deals, coupons, etc., the moment the customer 210 arrives and/or checks-in at the retail location. The system 200 may utilize the customer's past favorites, current needs/wants, purchase history, etc available for use by the sales associate 220 to provide a personalized customer experience.

Additionally, in one example, once the host system server 68 is notified of the customer's location and/or check-in status, the system 200 may initiate a call and/or other communication network utilizing the mobile distribution process described below. As noted above, during initiation of the customer call, the system 200 may utilize the customer's purchasing history, intentions, etc. to identify the proper sales associate. If the sales associate 220 is available, the interaction between the associate 220 and the customer 210 may be completed through text, voice, and/or video chat as noted. The communication between the associate 220 and the customer 210 system 200 may be sales associate or customer initiated.

As described below, as a customer 210 indicates their presence in a retail environment through the mobile application, the system 200 will identify a customer service agent that can assist the customer. The customer service agent is preferably located within the same retail environment as the customer, but the associate may be alternatively located anywhere within the customer care network. For the point of view of the sales associate, the associate may watch and/or otherwise monitor the system 200 to ensure that any customer 210 waiting for assistance, browsing online and/or in the store, asking for service, etc., is properly tended to. In the situation where the customer is identified as requiring assistance, and yet no local sales associate is available, the system 200 will route the call to a properly staff service center to ensure the customer is serviced.

Figure 3:
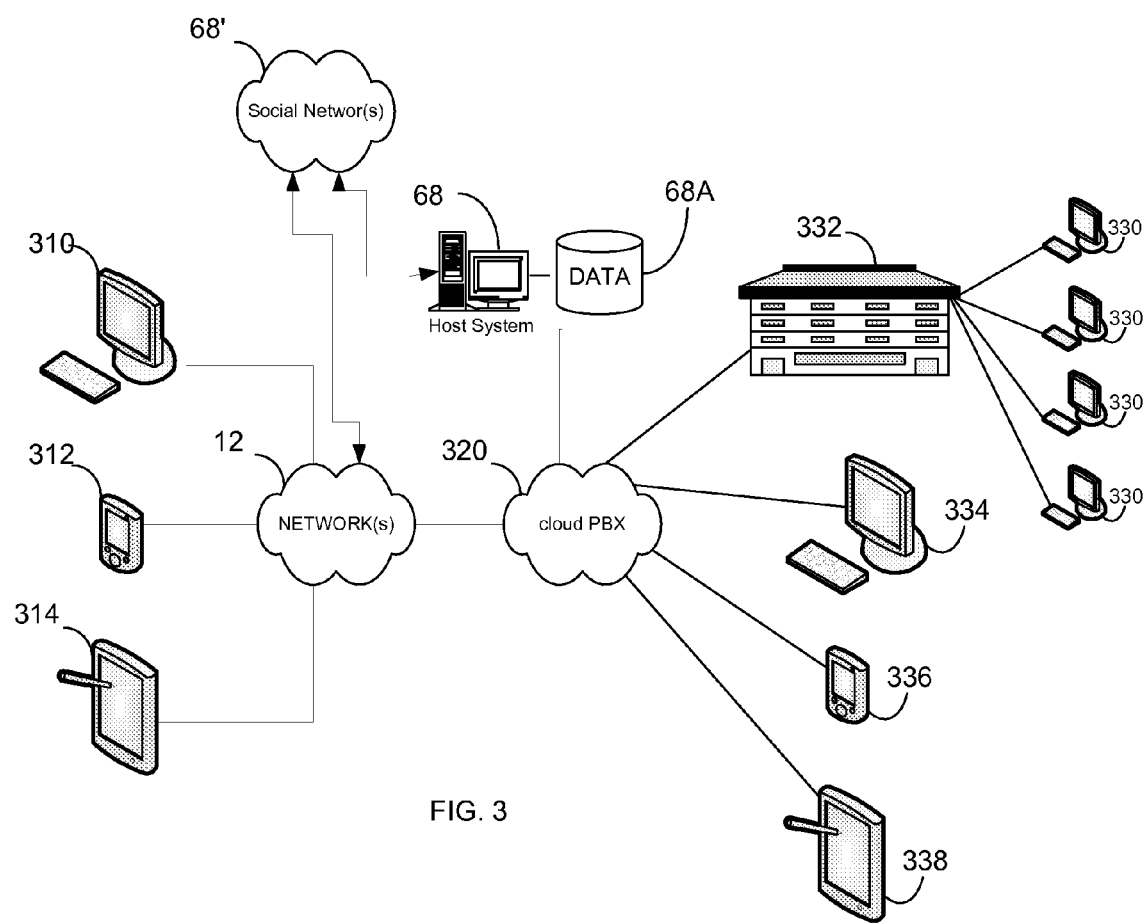
FIG. 3 illustrates a wire diagram of an example system for a service call system and a location based assistance in accordance with the present disclosure.

As illustrated in more detail in FIG. 3, in this example, the customer 210 remotely initiates a customer service call through any suitable device, such as a computer system 310, a smart phone 312, a tablet computer 314, or any other suitable known or yet to be developed communication device. In the disclosed example, the communication device is capable of video transmission (e.g., video chat, video phone, etc), but it will be appreciated by one of ordinary skill in the art that the communication device may be any suitable communication device including any voice and/or text communicator without use of video transmission. Once the service call is initiated, the call is routed through the network 12 to the host system server 68. In this example, routing of the service call utilizes a cloud based private branch exchange (PBX) 320, although any appropriate routing device (e.g., software, firmware, hardware, and/or the like) may be utilized. The service call is then routed to the best available customer service associate based on a predetermined business logic, one example of which will be described below. The available customer service agent may include one of a plurality of centralized associates located at terminals 330 associated with a traditional call center 332, or a distributed associate located at a personal computer 334, a smart phone 336, a tablet computer 338, or any other device.

The illustrated call center approach may take advantage of the convergence of mobile devices, IP telephony (e.g., VoIP, SIP, etc) and Internet application such as, for example, Facetime, Skype, etc. The example call center system may also enable interactive communications amongst customer service agents, customers, retail associates and partners, etc, across varied platforms, (e.g., iOS, Android, Windows, etc.), devices (e.g., Mobile phones, PCs, Macs, Tablets, etc), networks (e.g., Wi-Fi, 3G, 4G, etc.), and media (e.g., voice, text, video, etc).

Figure 4:
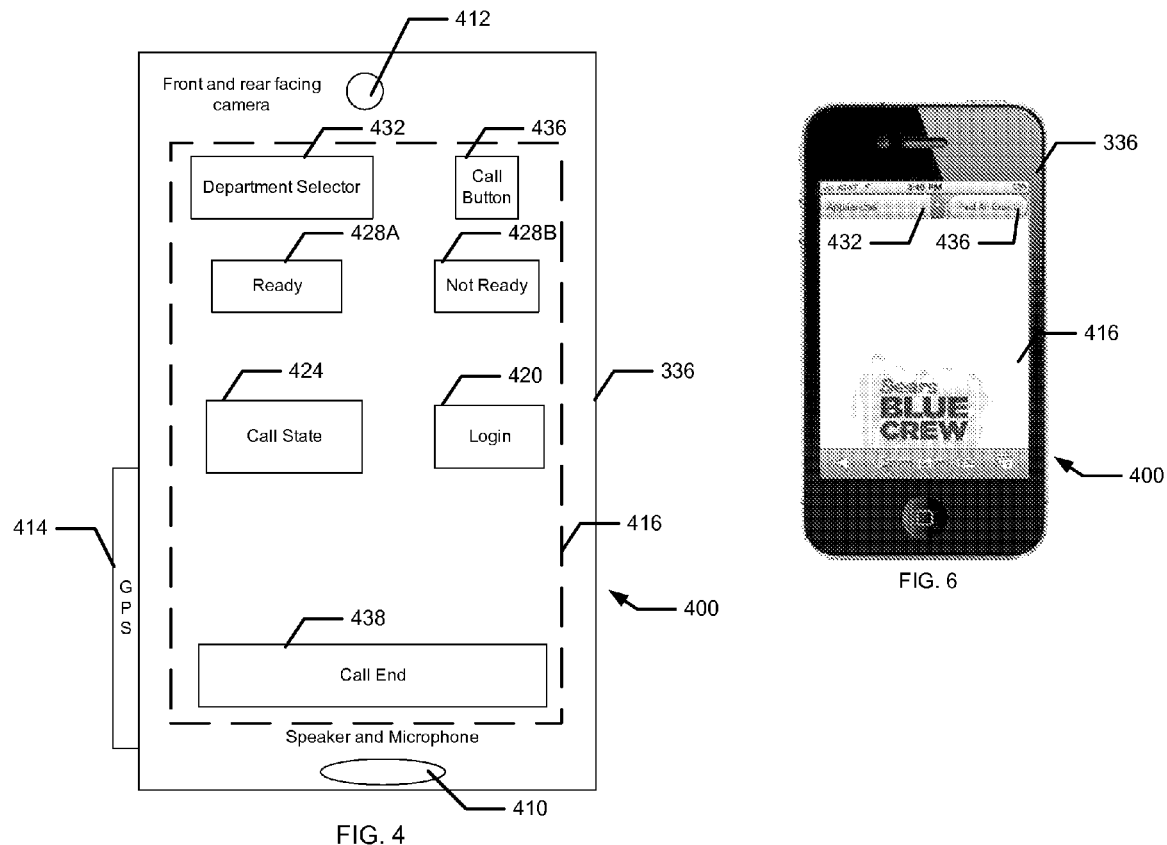
FIG. 4 illustrates an example user interface for implementing an example service call system in accordance with the present disclosure.

Turning to FIGS. 4, 5A-5C, and 6, there is illustrated one example user interface including user interface elements for conducting a service call in accordance with the teachings of the present disclosure. For instance, FIG. 4 illustrates an example user interface 400 shown in schematic form. In the illustrated example, the user interface 400 may be displayed on a communication device, such as the smart phone 336. The example smart phone 336 includes speaker and microphone 410, a camera 412 (e.g., a front and/or rear facing camera), and an external and/or internal location device 414, such as a global positioning system or other positioning system such as a cellular network positioning system, indoor positioning system (e.g., RFID, Bluetooth, Wi-Fi access, etc.). The smart phone 336 also includes a display 416 capable of displaying user interface elements to a user, and in this example, capable of receiving physical stimulations (e.g., touch) which may be interpreted by the smart phone 336 as input into the device. It is to be understood that the illustrated device is merely representative of one possible device capable of conducting a service center call and that other devices user interfaces, applications, and/or components may be used and/or omitted as desired.

In the examples illustrated in FIGS. 4 and 5A-5C, the user interface 400 include user interface elements representative of one user interface that could be utilized by a customer service agent. In this example, the user interface 400 includes a plurality of selectable elements on the display 416. For instance, the user interface 400 includes a log-in/log-out selectable element 420, a call status selectable element 424, at least one agent status selectable element 428, a department (e.g. category) selectable element 432, a call initiator selectable element 436 and/or a call terminator selectable element 438. It will be understood that the user interface may eliminate or include additional elements as desired. Additionally, while some elements are illustrated as separate and/or combined elements, one of ordinary skill in the art will appreciate that the elements may be combined and/or separated as desired.

Figure 5A:
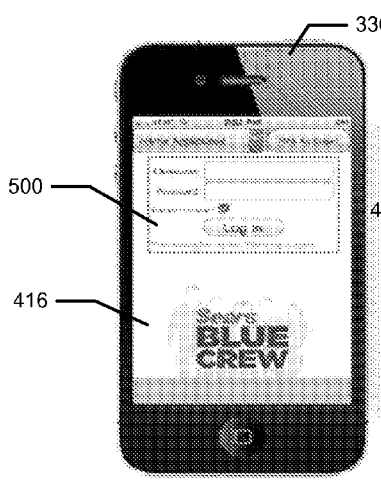
FIGS. 5A-5C together illustrate an example user interface for registering an agent with the example service call system in accordance with the present disclosure.

As shown in FIG. 5A, when the log-in/log-out selectable element 420 is selected (e.g., the element 420 is in a log-in mode), the user interface 400 displays a log-in element 500 which prompts the agent to log-in to the host system server 68 to register the agent with the host system server 68 and allow the agent to be eligible to receive service calls. If the agent is already logged-in to the host system server 68, the element 420 will be in a log-out mode, allowing the agent to select the element 420 and de-authorize the agent from the host system server 68. Although illustrated as a username and password combination in FIG. 5A, The log-in element 500 may be any suitable registration interface including, for example, a PIN, a swipe pattern, a biometric password, a user id and password combination, and/or any other authorization scheme. Additionally, the log-in requirement(s) may be secure, and/or unsecure as desired. As noted above, once the agent log-in is successful, the log-in/log-out element 420 may be updated to be in a log-out mode, allowing the agent to log-out from the host system server 68 as desired.

Once the agent is logged-in, or otherwise registered with the host system server 68, the agent may be presented with a plurality of user interface elements as described above, and as illustrated in FIGS. 4 and 5B-5C. For instance, the user interface may include the agent status selectable element 428 which in this example includes a uniquely selectable "Ready" and "Not Ready" portion 428A and 428B, respectively. In this instance, the agent can select the "Ready" portion 428A to indicate to the host system server 68 that the agent is available to receive service calls. If, however, the agent is busy and unable to accept calls, the agent may select the "Not Ready" portion 428B of the element 428, to indicate to the host system server 68 that the host system server 68 should not connect any service calls to the agent. In the example illustrated in FIG. 5C, the "Not Ready" portion 428B may include a plurality of selectable elements 440 indicating a reason for the unavailability of the agent. In this instance, by selecting a reason for unavailability, the host system server 68 may utilize the information in any suitable manner, including agent performance evaluations, program evaluations, optimization of business logic, statistical analysis, and/or modification of the business logic processing, or any other suitable manner.

Figure 5B:
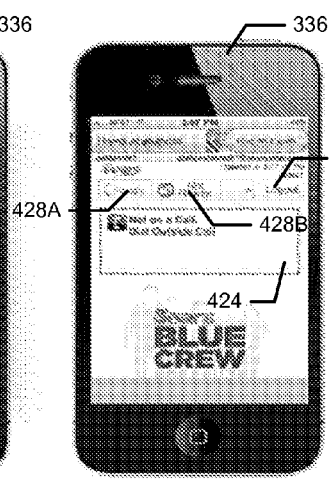
Figure 5C:
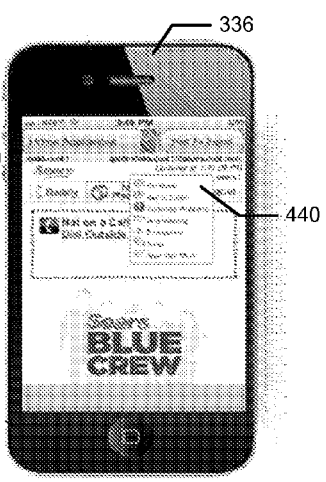

In addition to the identified elements, the user interface 400 may include the call state element 424 best illustrated in FIG. 5B. The call state element 424 displays the status of any currently conducted service call. For instance, as illustrated, the call state element 424 provides the agent with a visual indication that the agent is not currently on a service call. It will be understood that the call state element 424 may provide the agent with any suitable information and/or processing choices, including the ability to dial an outside line, etc. The agent may terminate a service call by selecting the call terminator selectable element 438 as is known. It will be understood that the service call may be conducted in video mode, and thus the video call may be displayed on any suitable portion of the display 416, and may utilize the camera 412 as appropriate.

Turning to FIG. 6, there is illustrated an example user interface 400 that may be provided to the user 210 seeking to establish a service call with an agent 220. In this example, the user interface 400 includes the display 416 for conducting a video service call, the department selectable element 432, and the call initiator selectable element 436. In this example, the department selectable element 432 includes the ability for the user to select the area of expertise that the user is looking to receive help on. For instance, the user may select appliances, electronics, bedding, or any other category. It will be appreciated that the department selectable element 432 may be eliminated as desired and the service call may be generally connected and routed through any desired means, including automatic call distributor (ACD), Interactive voice response (IVR) routing, etc. The user may select the call initiator element 436 to connect to a service agent registered with the host system server 68.

In one example, a user can start a service call with an agent by announcing their location (either automatically and/or manually), by "checking-in" to a particular location, scanning an identifying code, such as for example, a bar code, a two-dimensional bar code (e.g., a QR Code, etc.), or other similar identifying code. Alternatively, the user may initiate a service call through a voice, text, and/or video call application, and/or may further initiate a call through a mobile website. The initiation of the service call may be tied to a generic number/address/code, or may be specialized to a product, department, location, etc. For example, the user can scan a generic two-dimensional bar code such as a QR Code, wherein the QR Code initiates the user interface 400 for assisting in connecting the user with the current service call agent. As noted above, the user interface 400 may provide various department and/or other selectable identifying elements to assist in directing the user to the correct service call agent. Still further, if a more specific means of initiating the call is performed (e.g., a specialized code, SKU number, QR code, etc.), the code may be resolved by the user interface 400, the host system server 68, and/or any other element of the system to ensure the call gets routed accordingly.

In one example, a user in a retail location wishes to receive a customer service call directed toward a retail item such as a table saw. The user can initiate a service center call through their mobile device by scanning a code, or by calling a telephone number. The user's call is routed to an agent with saw expertise to discuss the purchase of a table saw to ensure the user gets the correct product. The saw can be demonstrated live to the user (if video equipped) and key features may be highlighted for the user's benefit. The user and service call agent may be located in the same retail location, or may be located in separate (e.g., remote) locations as necessary. Still further, the user's and/or the agent's location may be identified through the use of the location device 414, allowing the user and/or agent to recommend additional services based upon their location, to find each other if in the same general vicinity (even within the same retail location, such as, for example, through internal store based location services), and/or identify additional location based specials, services, coupons, etc. The user and/or agent may be able to utilize external and/or internal mapping services to direct and/or to be directed to additional items of interest, etc.

In another example, a user attempting to purchase an item may initiate a service call due to a sizing and/or color question. Again, the user initiates that call through any suitable means, and is connected to a service agent. A customer service agent may be able to exchange videos, and hold a conversation with the shopper from a remote location and provide advice on the size, color, shipping options, sales, etc., all while the user is looking at the merchandise in the retail location. The service agent may recommend additional color selections and/or sizes available at other location close to the user (via location services), may suggest coordinating items, arrange for delivery of the item that is out of stock, etc.

In still another example, a user can initiate a call regarding an item that may be in need of repair, such as for example, an appliance in the user's home. The user can initiate the service call and provide the service agent with a visual picture of the offending part that may be in need or repair. By being able to visually see the item the service agent may be able to identify the right part, provide warranty and/or service information, and/or schedule a repair service call.

In still another example, a user may shop at home and/or other location outside of the retail location and may call to inquire about a sale item, an item for retail purchase, and/or an outlet item. For example, a user may see an advertisement including a QR Code for more information regarding an item for sale. Alternatively, the user may be contacted directly by the sales associate based upon a customer profile gleaned from the customer's past interaction with the retail locating and/or based upon social media posting/content. In any event, the call may be connected to a service agent at the location of the item (e.g., a sales associate at the retail location) where the agent may be able to provide visual information and/or a description of the item for use by the user to determine whether they wish to buy the item. The service agent may complete the sale while the user is on the service call, and may have the item delivered and/or have the item waiting the user for immediate impact, thereby streamlining the purchasing process, and in some instances, proactively making a sale.

Finally, as described above, the customer may be connected to a sales associate in order to receive support regarding an item the customer is looking for, may be connected to the customer's friend, or may be connected to other shoppers present at the same location. The system 200 enables a customer to find and communicate with various types of people in real or near real-time based on the customer's location or based on the customer's needs/wants. The system 200 is also provided with the capability to utilize data from various system resources, including shopping lists, online activity, shopper history, rewards history, wish-lists, sizing data, etc. to receive and/or request specific purchasing support.

Figure 7:
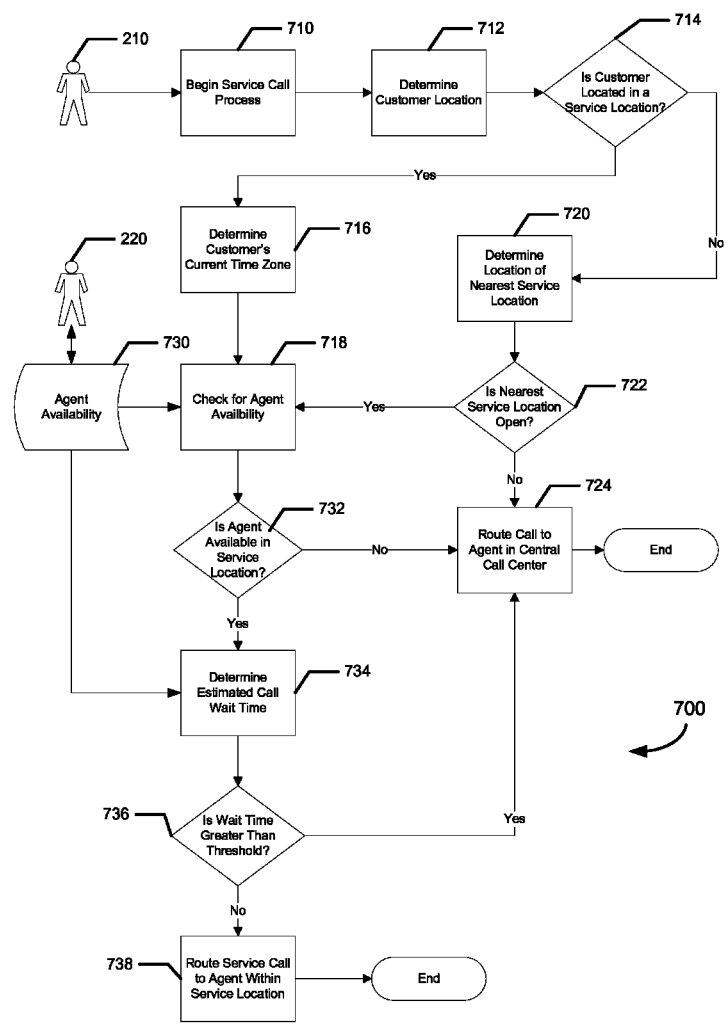
FIG. 7 illustrates a detailed flowchart of an example method and system for processing a service center call request in accordance with the present disclosure.

Referring to FIG. 7, there is illustrated a flowchart of an example service center process 700 that may be implemented on a computer system and/or provided on a non-transitory computer-readable medium to implement the connection portion of the system described herein. While in the described example, a retail location is described, it will be appreciated that the disclosed processes and systems may be implemented in any suitable environment, including, for example, any service location, or other environment where a service call may be placed.

In the example of FIG. 7, the process 700 begins at block 710 when a customer initiates a service center call. As previously noted, the call may be initiated through the identification of the user's location, a "check-in" request, the scanning of an identifying code, such as for example a QR Code, through a application such as a website and/or communication application and/or may be initiated with a traditional phone call. At block 712, the customer's location may be determined through any available means, including, for instance, through global positioning (GPS), cellular network location identification, radio frequency identification (RFID), Bluetooth, wireless network identification (Wi-Fi), unique identifier in the scanned identification code, zip code, interactive voice response, Dual Tone Multiple Frequencies (DTMF) tones, or any other suitable location determination process.

Upon determination of the customer's location, the process 700 determines whether the customer is located within a service location, such as for example a retail location, or at least within a suitable distance threshold to be considered at the service location at block 714. The process of determining whether the customer is in a specific service location may be determined through any suitable determination process, including a comparison between the determined location and a listing of known service locations, a determination whether the customer is on an identifiable network, or other determination process.

If the customer is located within or sufficiently near a service location, the process 700 may determine the customer's current time and/or time zone at block 716 and check for agent availability at block 718. If, however, the process 700 determines that the customer is not located at a service location, such as for instance a retail establishment, the process will determine the location of the nearest service location at a block 720. Because the customer may be near multiple service locations, and/or because the customer may have a preference for a particular service location, the process 700 may query the customer and allow the customer the ability to choose from multiple location options. At block 722, the process 700 may determine whether the desired location is open for business, and if so, process with continue at block 718 by checking for agent availability. Otherwise, if no location is open for business, the call will be processed at block 724 by routing the call to an agent in a centralized call center.

In checking for agent availability at block 718, the process 700 may rely upon a listing of agent availability 730. The agent availability 730 may be, for example, an electronic record of data stored in the data repository 68A. In this example, the agent availability 730 is populated by agents utilizing the user interface previously described in connection with FIGS. 4 and 5A-5C. Relying upon the agent availability data, at block 732, the process 700 determines whether there is an agent available in the same service location as the customer. In this example, if there is not an available agent, the process 700 continues with block 724, where the call is routed to an agent in the centralized call center If, however, the process 700 determines that there is an agent available at the customer's service location, at block 734 the process 700 may determine the estimated call wait time utilizing agent availability 730 and/or any other statistical analysis. At block 736, the process 700 may determine whether the estimated wait time is greater than an acceptable threshold, and if so, route the call to an agent in a central call center at block 724. As will be appreciated by one of ordinary skill in the art, routing calls through a central call center may be performed utilizing any suitably known or yet to be developed call center distribution technology. It will be also be appreciated that a customer may identify a "favorite" agent, and if the favorite agent is determined to be unavailable, the customer may leave a message requesting a return call, etc.

If the process determines the wait time is within sufficient parameters for a successful service center call, the call may be routed to an agent within the service location at block 738. The service call may be conducted as desired, and may also include various identifying information including the customer location, the item of interest, any memberships and/or VIP status, etc. In this way, the agent may best be able to service the local customer's concerns and/or questions. It will further be understood that in various other examples, the call may not be routed directly to an agent in the customer's service location, but rather may be directed to an expert at another location (e.g., at another service location or at a central call center) as desired. For example, if an agent in another service location has particular expertise in a certain product, the process 700 may route the customer directly to the expert as necessary. In this way, the agent availability 730 may include predetermined logic to rank and/or identify agent characteristics and expertise to best route the customer through the service call experience.

Figure 8:
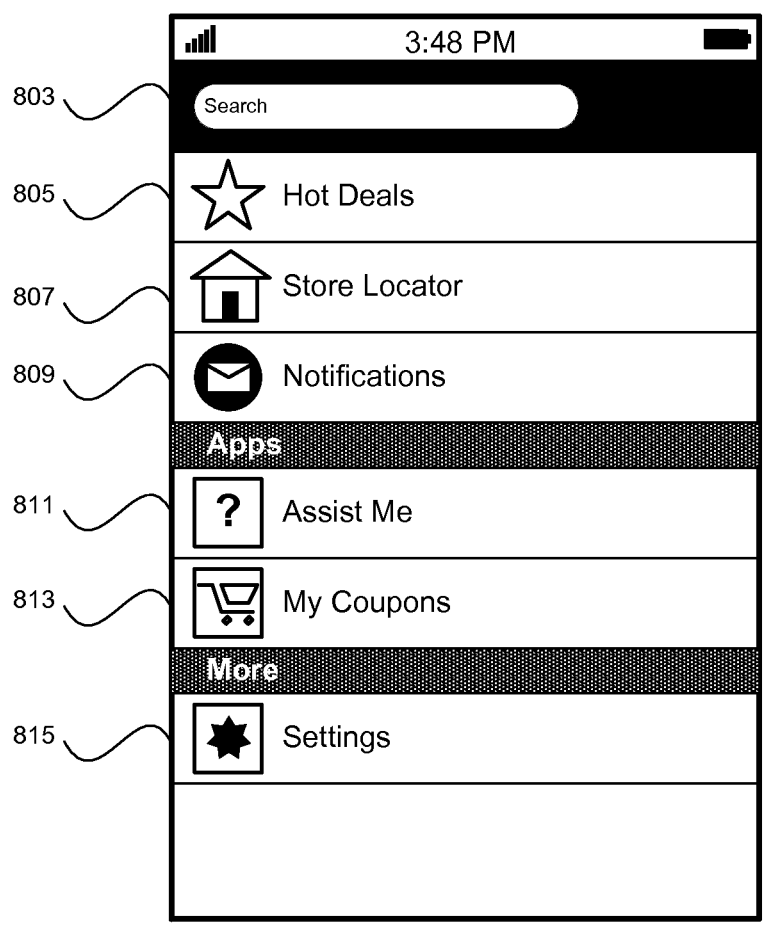
FIG. 8 is an illustration of an example screen of a software application that may, for example, be used on a computing or communication device of a customer, and which includes a means to request customer assistance, in accordance with a representative embodiment of the present invention.

FIG. 8 is an illustration of an example screen 800 of a software application that may, for example, be used on a computing or communication device of a customer, and which includes a means to request customer assistance, in accordance with a representative embodiment of the present invention. The software application that displays the screen 800 may be made available by, for example, a retail business or sponsor that may have "brick-and-mortar" locations and/or e-commerce storefronts of interest to the customer, via a system such as the host system server 68, discussed above, and/or via a distribution system run by a third party. While the discussion that follows may be described in terms of a particular software application running on a mobile or handheld device, the present invention is not necessarily limited to the example embodiment, and may also be employed on various forms of personal computer (PC) devices including, for example, a desktop or laptop computer, a netbook or ultrabook, a tablet computer, a smart phone, or any other suitable electronic device, and may also be realized using a PC with web browser that may communicate via the Internet with a suitable computing platform such as the host system server 68, discussed above. The customer may, for example, acquire the software application via a download from a web site of the business or organization sponsoring the software application, or from a centralized source of software applications such as, for example, an "app store."

The example screen 800 illustrated in FIG. 8 includes a number of features such as a "Hot Deals" button 805 for accessing information about products or services that are being offered at reduced prices or that are a special value, a "Store Locator" button 807 to enable the customer to find a location of a store in their current area, within a certain distance from their current location, or within a specified area, and a "Notifications" button to enable the customer to review any messages or notifications sent to them by the business/organization that sponsors the software application. In addition, the screen 800 includes a "My Coupons" button 813 to permit the customer to display any e-coupons that they may have stored on the customer device, and a "Settings" button 815 to allow the customer to change user-definable settings affecting the software application or the customer device.

The illustration of FIG. 8 also shows an "Assist Me" button 811 that enables the customer to request assistance related to products and/or services of the business or sponsor of the software application activated by the user and that generates the screen 800. In response to customer selection of the "Assist Me" button 811, the software application may, for example, display a listing of "brick-and-mortar" business locations of the sponsor of the software application generating the screen 800. The business names and business locations displayed may be selected based on a geographic location of the user device as determined by the software application using any suitable means of geo-location such as, for example, a global positioning system receiver, circuitry for near field communication (NFC), a scanning device for scanning an object or an identifying code (e.g., a bar or two-dimensional code such as a "QR code"), by information entered by a user (e.g., a business address or zip code), or using an Internet Protocol (IP) address, a Media Access Control (MAC) address, or by any other suitable means. The location of the user device may also be determined by an external system such as a wireless local area or wide area network using, for example, cell site information, signal strength information, time difference of arrival (TDOA) information, or any other suitable method.

Figure 9:
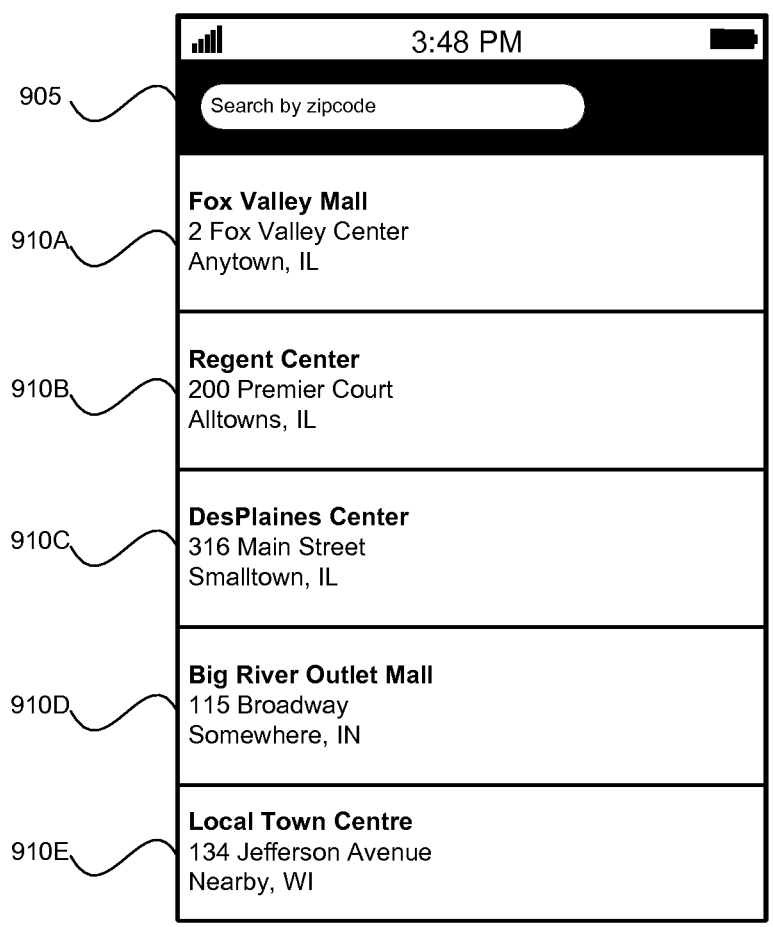
FIG. 9 is an illustration of an example screen of a software application that may be run on, for example, a mobile or handheld device of a user, showing a listing of business locations that is displayed in response to a customer request for assistance, such as the activation of the "Assist Me" button of FIG. 8, in accordance with a representative embodiment of the present invention.

FIG. 9 is an illustration of an example screen 900 of a software application that may be run on, for example, a mobile or handheld device of a user, showing a listing of business locations 910A-910E that is displayed in response to a customer request for assistance, such as the activation of the "Assist Me" button 811 of FIG. 8, in accordance with a representative embodiment of the present invention. The listing of business locations may include, for example, business locations identified by the user by a search of business names, or by a request to display businesses within a geographic region that may be defined by the user of the device, or by a system such as, for example, the host system server 68, discussed above. The business locations selected for display may, for example, be identified using a location determined by the handheld device or from information provided by the user of the handheld device, such as those business locations within a certain zip code 905, or it may be determined using information produced by a wireless communication infrastructure known to or to which the handheld device has been or is linked. In addition, the business locations chosen for display may be selected for display using, for example, purchase history information for the user as a customer, historical information indicating business locations in which a visit by the user was detected, or personal preferences of the user such as, for example, information about prior purchases from or calls for assistance by the user to a particular store, a particular chain of stores, or affiliates or partners of a particular business or sponsor of the software application on the handheld device or a supporting system such as the host system server 68, discussed above. The business locations chosen for display may also be selected using personal preference information such as, for example, brand preferences, customer service agent preferences, or store preferences expressed by the user. The user of the software application may then select a particular business location of interest to the user from the listing of business locations 910A-910E, such as, for example, the business location at "Local Towne Center" 910E.

Figure 10:
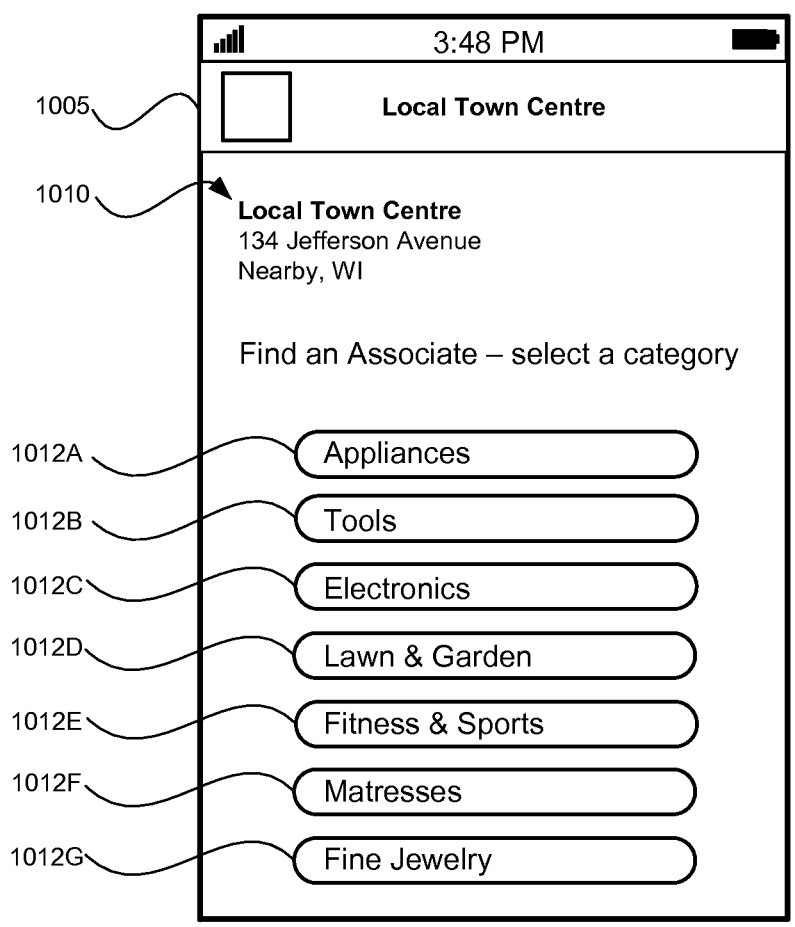
FIG. 10 shows an illustration of an example screen that displays additional details for the customer-selected business location of FIG. 9, including a list of departments/product categories at that business location, in accordance with a representative embodiment of the present invention.

FIG. 10 shows an illustration of an example screen 1000 that displays additional details for the customer-selected business location 910E of FIG. 9, including a list of departments/product categories 1012A-1012G at that business location, in accordance with a representative embodiment of the present invention. As shown in FIG. 10, the screen 1000 has a header 1005 that identifies the customer-selected business location, and address details 1010 for the customer-selected selected business location, in this case, the customer-selected business location 910E of FIG. 9. The screen 1000 also includes a listing showing departments/product categories 1012A-1012G at the customer-selected business location 910E, from which the customer may select a department/product category for which the customer needs assistance. For example, the customer may select the "Appliances" department/product category 1012A, if the needed assistance relates to a clothes washer, clothes dryer, refrigerator, freezer, oven, or cook-top. Following selection of the "Appliances" department/product category 1012A, for example, the screen of FIG. 11 may be displayed to the customer.

Figure 11:
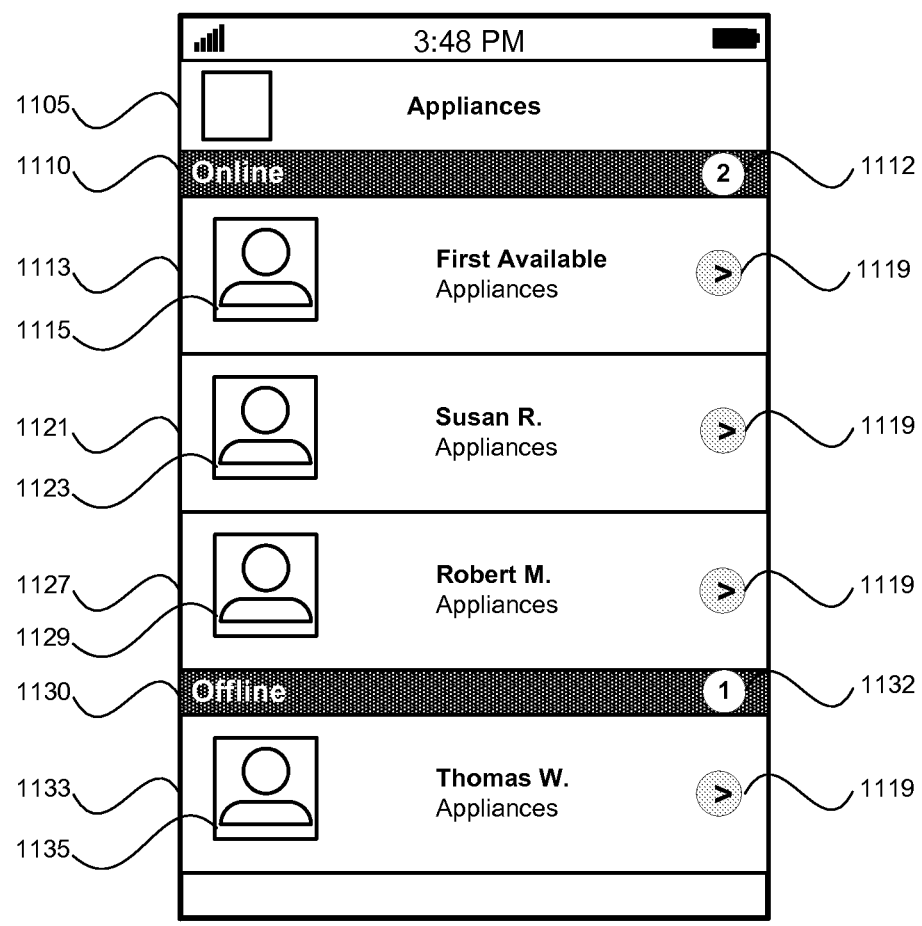
FIG. 11 shows an example screen that includes a listing of customer service agents able to provide assistance for the customer-selected product category/department of the customer-selected business location, in accordance with a representative embodiment of the present invention.

FIG. 11 shows an example screen 1100 that includes a listing of customer service agents able to provide assistance for the customer-selected product category/department of the customer-selected business location, in accordance with a representative embodiment of the present invention. The screen 1100 includes a header 1105 that identifies the product category selected by the customer, a sub-header 1110 that identifies a listing of customer service agents known to be online, and a sub-header 1130 that identifies a listing of customer service agents that are not online (i.e., they are "offline"). In the example of FIG. 11, the sub-header 1110 includes an indication of the number customer service agents for the selected business location that are currently online 1112, while the sub-header 1130 displays an indication of the number of customer service agents for the selected business location that are currently offline 1132. The online/offline status of customer service agents at the particular business location selected by the customer, and at any of the other business locations selectable by the customer, may be tracked by a system such as, for example, the host system server 68, discussed above.

In FIG. 11, the listing of customer service agents 1110 that are currently known by a system such as the host system server 68, previously discussed, to be "online" represents those customer service agents that are electronically accessible and able to respond to customer requests for assistance, while the listing of customer service agents 1130 are those customer service agents currently known by the host system server 68 to be offline, not electronically accessible, and that may be unable to currently respond electronically (e.g., via voice, text, or email messaging) to a customer request for assistance.

As illustrated in the example of FIG. 11, the listing of online customer service agents shows three entries, one that allows the customer to request a response from the "first available" customer service agent 1113, and entries for two specifically identified customer service agents named "Susan R." 1121, and "Robert M." 1127. The number of specifically identified online customer service agents (i.e., two in the example of FIG. 11) is indicated by a numeric indicator 1112, although other forms of indication, or no indication, may be presented. The customer may choose to request assistance using any of the three entries 1113, 1121, 1127 by clicking/selecting the arrow icon 1119 in the entry of the customer's choice.

In a representative embodiment of the present invention, the "first available" customer service agent 1113 entry may simply show a generic outline of a person 1115. The two entries of the specifically-identified customer service agents "Susan R." 1121 and "Robert M." 1127, however, may include thumbnail photographs 1123, 1129 of those individuals, when available, which may aid the customer in selecting someone to assist them in a situation in which the customer has previously met and spoken with a person at the selected business location, whose name they cannot recall, or to help recognize the customer service agent should the customer subsequently meet the customer service agent in the selected business location. Should the customer choose to request assistance from the customer service agent "Susan R." 1121 by clicking/selecting the corresponding arrow icon 1119, a screen such as that shown in FIG. 12A, discussed further below, may be displayed to the customer. If a thumbnail photograph is not available for a particular customer service agent, a generic outline or other graphic may be displayed.

As mentioned above, the illustration of FIG. 11 also shows an entry for a customer service agent that is currently offline, "Thomas W." 1133. Because "Thomas W." 1133 is offline, he may not be able to be immediately notified of the customer request, and cannot be relied upon to return a call within the amount of time allowed. Should the customer choose to request assistance from the offline customer service agent "Thomas W." 1133 by clicking/selecting the corresponding arrow icon 1119, a more limited screen such as that shown in FIG. 12B, discussed in greater detail below, may be displayed to the customer.

When more than one specifically-identified customer service agent is shown in a screen such screen 1100 of FIG. 11, the order in which such customer service agents are displayed in either the online or offline listings may be determined using any of a number of factors. Such factors may include, for example, purchase history information for the customer requesting assistance, a classification of the duration of the relationship of the business or its partners with the customer, the frequency and/or amount of products and or service purchased by the customer (e.g., VIP) from the business or its partners, the level of experience in the customer-selected department/product category of each of the customer service agents currently online, historical information indicating prior interactions of the customer with particular customer service agents, and any customer preference for particular customer service agents.

Figure 12A:
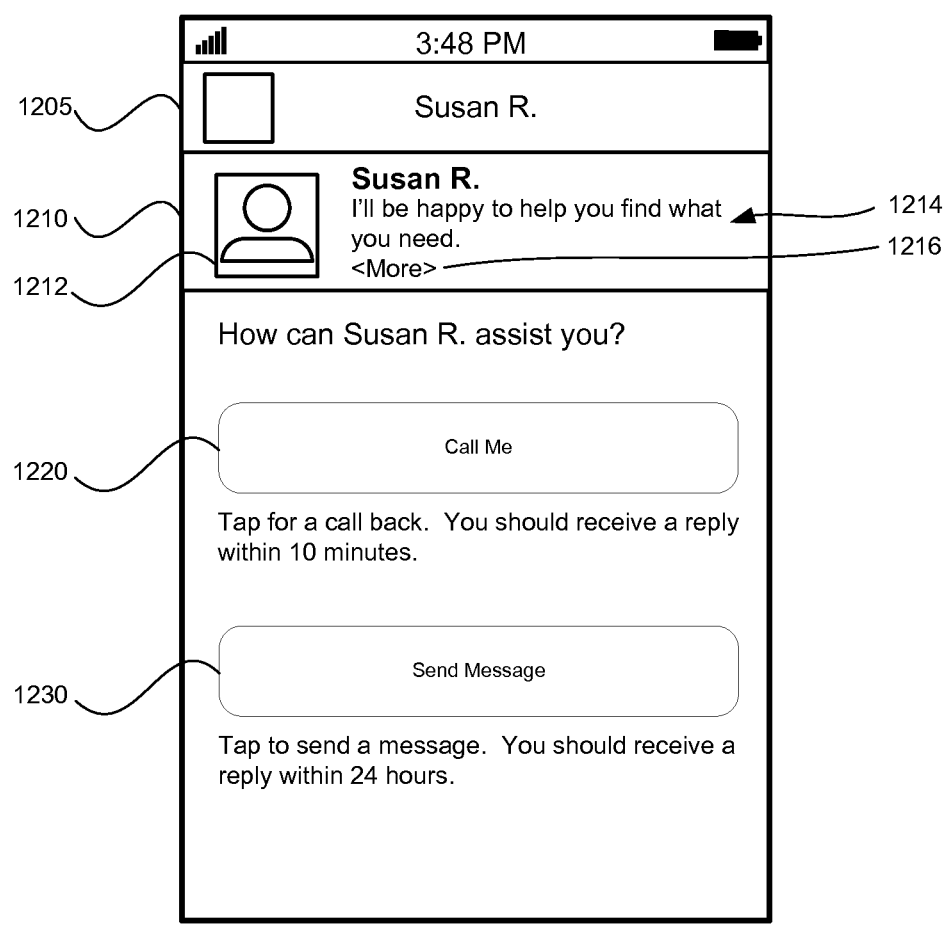
FIG. 12A shows an illustration of an example screen that may be displayed upon customer selection of a customer service agent from the listing of customer service agents that are online of FIG. 11, such as the entry for customer service agent "Susan R.", in accordance with a representative embodiment of the present invention.

FIG. 12A shows an illustration of an example screen 1200A that may be displayed upon customer selection of a customer service agent from the listing of customer service agents that are online 1110 of FIG. 11, such as the entry for customer service agent "Susan R." 1121, in accordance with a representative embodiment of the present invention. The screen 1200A includes a header 1205 that identifies the customer-selected customer service agent, and information about the customer-selected customer service agent, including a thumbnail picture 1212 and a greeting 1214 from the customer-selected customer service agent. In addition, the user may be offered two ways in which the user may make contact with the selected customer service agent. A "Call Me" button 1220 is provided, to enable the customer to request a call-back by the customer service agent. An amount of time within which the customer service agent is to reply may be indicated. The customer may also be provided with the option of clicking/selecting a "Send Message" button 1230 and entering a message to be sent to the customer-selected customer service agent. A certain amount of time in which the user may expect a response may be shown in this instance, to permit the customer to know when to take further action with respect to their request.

FIG. 12A shows an illustration of an example screen 1200A that may be displayed upon customer selection of an online customer service agent such as "Susan R." 1121 of FIG. 11, in accordance with a representative embodiment of the present invention. The example screen 1200A includes a header 1105 that identifies the selected customer service agent, information about the selected customer service agent including a thumbnail picture 1212, and a greeting 1214 from the selected customer service agent. Additional details for the customer service agent such as, for example, a nickname, their hobbies, years of experience in their department, to name a few, may also be shown. In addition, the user may be offered different methods in which the customer may make contact with the selected customer service agent. In the example of FIG. 12A, a first method uses "Call Me" button 1220, to enable the customer to request a call back from the selected customer service agent. The call-back may be, for example, in the form of a voice call using wireless cellular or Wi-Fi networks, an IP-based packet network, or a wired network, or the call-back may be in the form of a video call using the same forms of wired and wireless communication networks. An amount of time within which the customer service agent is to reply may be displayed, to inform the customer at what point in time they may expect the customer service agent to be in touch. As illustrated in FIG. 12A, a second method may be provided, by which the user may click/select a "Send Message" button 1230 and enter a message to be forwarded to the selected customer service agent. A certain amount of time may also be shown in this instance, to permit the customer to know when to expect a response. The example of FIG. 12A also includes a "More" link 1216, to request the display of further information about the customer service agent. Such further information may include, for example, information about the work schedule of the customer service agent, to enable customers to know the times at which the customer can electronically reach the customer service agent, and/or when they can be found at the selected business location. The ability to schedule appointments with a particular customer service agent may also be provided.

Figure 12B:
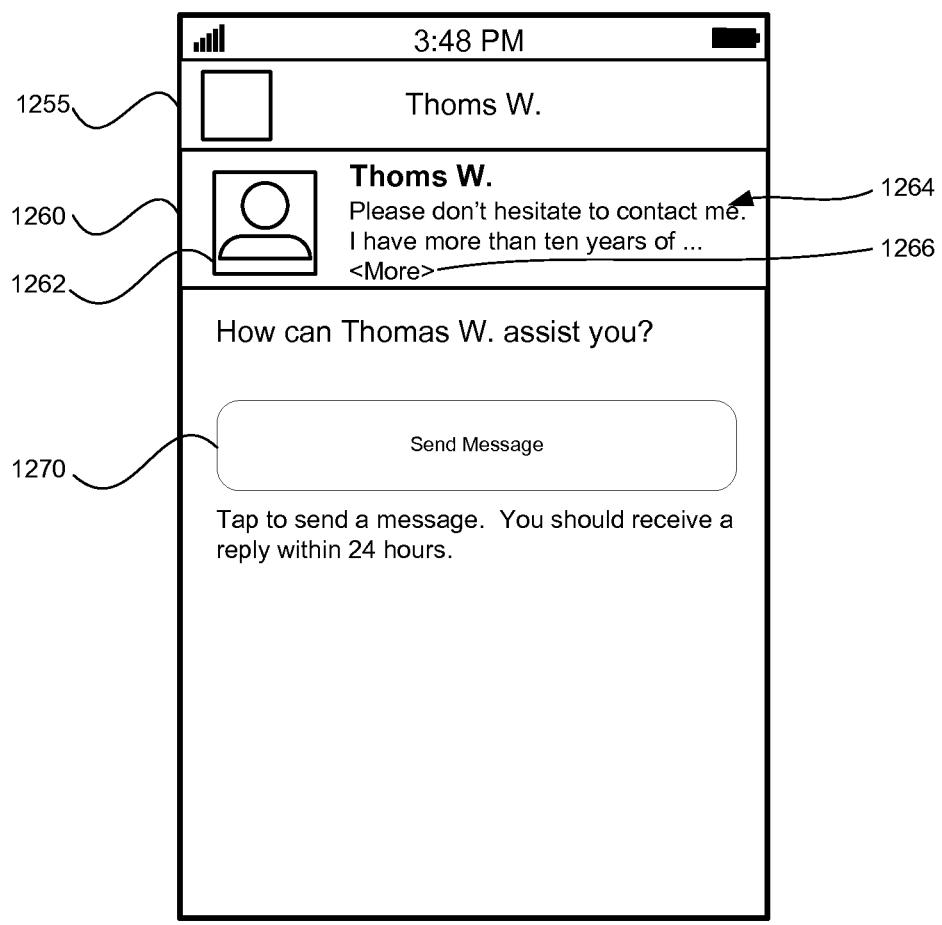
FIG. 12B shows an illustration of an example screen that may be displayed in response to customer selection of a customer service agent from the listing of FIG. 11 showing customer service agents that are offline, such as the entry for customer service agent "Thomas W.", in accordance with a representative embodiment of the present invention.

FIG. 12B shows an illustration of an example screen 1200B that may be displayed in response to customer selection of a customer service agent from the listing of FIG. 11 showing customer service agents that are offline 1130, such as the entry for customer service agent "Thomas W." 1133, in accordance with a representative embodiment of the present invention. As in the illustration of the screen 1200A of FIG. 12A, the screen 1200B includes a header 1205 that identifies the customer-selected customer service agent, information about the selected customer service agent including a thumbnail picture 1262, and a greeting 1264 from the selected customer service agent. The example of FIG. 12B also includes a "More" link 1266, to request the display of further information about the customer service agent. As in the example of FIG. 12A, such further information may include, for example, information about the work schedule of the customer service agent, to enable customers to know the times at which the customer can electronically reach the customer service agent, and/or when they can be found at the selected business location. The ability to schedule appointments with a particular customer service agent may also be provided.

In the example of FIG. 12B, the customer may be offered only one way in which to make contact with the selected customer service agent. Because the customer service agent in this instance, "Thomas W.," is offline, the screen 1200B may include only a "Send Message" button 1270 that when clicked/selected permits the customer to enter a message to be sent to the selected customer service agent. As in the example of FIG. 12A, a certain amount of time within which the customer can expect a response from the customer service agent may also be provided.

FIGS. 13A-13D illustrate the actions of a method of providing customer assistance, in accordance with a representative embodiment of the present invention. The method of FIGS. 13A-13D may be performed by a user device such as, for example, the devices 20, 20', 20" of FIG. 1, or by a system such as the host system server 68, discussed above. In the following discussion of the method of FIGS. 13A-13D, the terms "business location" and "service location" may be used herein to refer to a location of a business from which the customer is seeking assistance. The following description of the method of FIGS. 13A-13D makes reference to the elements of FIGS. 1-12B, which are described above.

Figure 13A:
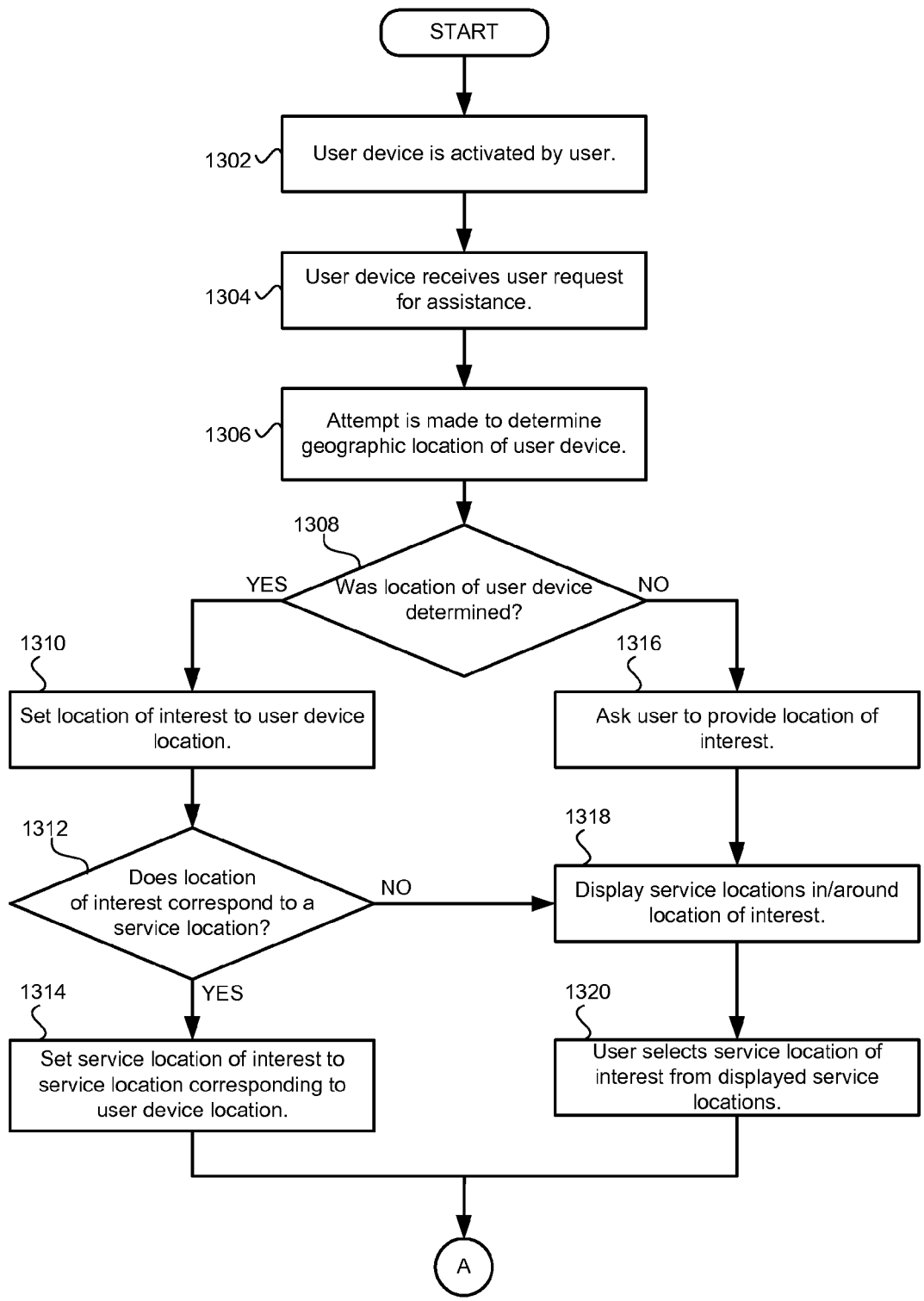
FIGS. 13A-13D illustrate the actions of a method of providing customer assistance, in accordance with a representative embodiment of the present invention.

The method of FIGS. 13A-13D begins at block 1302 of FIG. 13A, where a processing device of a customer such as, for example, a mobile or handheld device such as a smart phone, tablet computer, or PC that performs the method is activated/enabled/selected by the customer, or an application implementing the method of FIGS. 13A-13D is started. At some time after activation, at block 1304, the method receives a request for assistance from the customer. The received request may, for example, be as discussed above with respect to the "Assist Me" button 811 of FIG. 8. In response to the customer request for assistance, the method may then, at block 1306, attempt to determine a geographic location of the customer device. Determining the location of the customer device may use any suitable method of geo-location, as previously described above.

If, at block 1308, the method finds that determination of the location of the user device was not successful, the method may then, at block 1316, ask the customer to provide information identifying the location of interest. Then, at block 1318, the method displays a list of the business/service location at and/or around the location of interest. Next, at block 1320, the customer may select a business/service location from the displayed list. The method of FIG. 13A then continues at block 1322 of FIG. 13B.

If however, at block 1308, the method finds that the determination of the location of the customer device was successful, the method then, at block 1310, sets the customer's location of interest to the determined location of the customer device. Then, at block 1312, the method determines whether the customer's location of interest is within a certain threshold distance of a business/service location of the business or sponsor from whom the customer is requesting assistance. If it is determined, at block 1312, that the customer's location of interest is within the certain threshold distance of a business/service location of the business or sponsor from whom the customer is requesting assistance, the method then, at block 1314, sets the business/service location of interest to the location of the customer device. In some representative embodiments of the present invention, a determination may be made whether the customer's location of interest is within another, possibly smaller threshold of distance, of the business/service location of the business or sponsor, the method may notify one or more customer service agents at the business/service location that the customer is currently at their location and needs assistance. The location of the customer within the business/service location may be determined using location techniques such as those described in U.S. patent application Ser. No. 13/494,758 filed Jun. 12, 2012, which is hereby incorporated herein by reference, in its entirety. The method then continues at block 1322 of FIG. 13B. If, however, the method determines, at block 1312, that the customer's location of interest is not within the certain threshold distance of a business/service location of the business or sponsor from whom the customer is requesting assistance, the method then continues at block 1318 of FIG. 13A, which is described above.

Figure 13B:
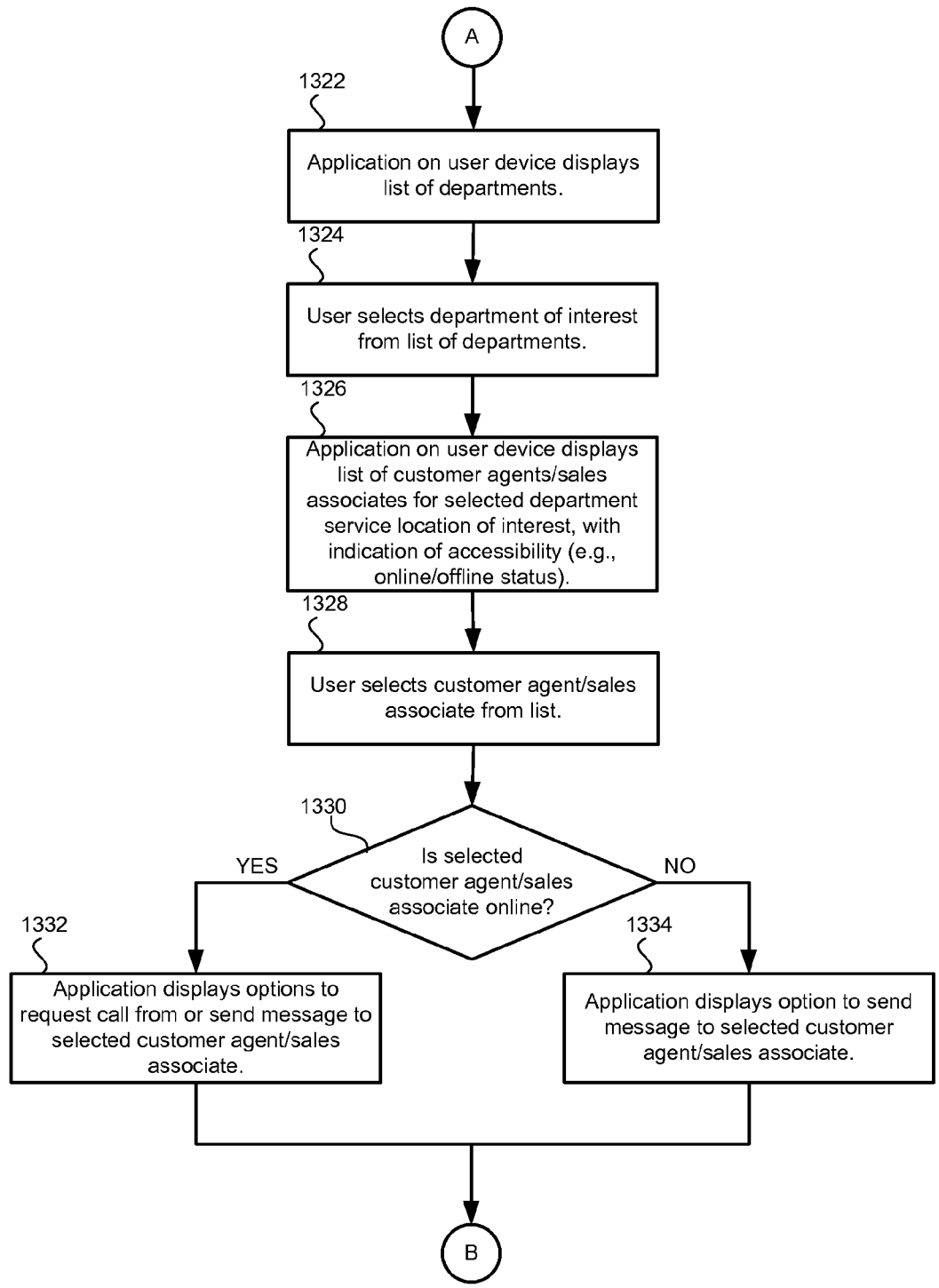

FIG. 13B illustrates additional actions of the method of providing customer assistance which began at FIG. 13A, in accordance with a representative embodiment of the present invention. The portion of the method illustrated in FIG. 13B begins at block 1322, where the customer device may display a list of departments/product categories. Next, at block 1324, the customer selects the department/product category of interest from the displayed list. Then, at block 1326, the method displays a list of customer service agents for the customer-selected department/product category at the business/service location of interest, along with an indication of their accessibility (e.g., online/offline, available/unavailable, etc.). Next, at block 1328, the customer may choose to select a specific customer service agent, or the next available customer service agent, from the displayed list.

Next, at block 1330, the method determines whether the customer-selected customer service agent is online or offline. If it is determined that the customer-selected customer service agent is online, the method continues at block 1332, where the options to request a call-back from, or to send a message to the customer-selected customer service agent may be displayed to the user. If, at block 1330, it is determined, however, that the customer-selected customer service agent is not online (i.e., is offline), the option to request a call-back from the customer service agent may not be displayed to the user, and only the option to send a message to the customer-selected customer service agent may be displayed. In either case, the method continues at block 1336, on FIG. 13C.

Figure 13C:
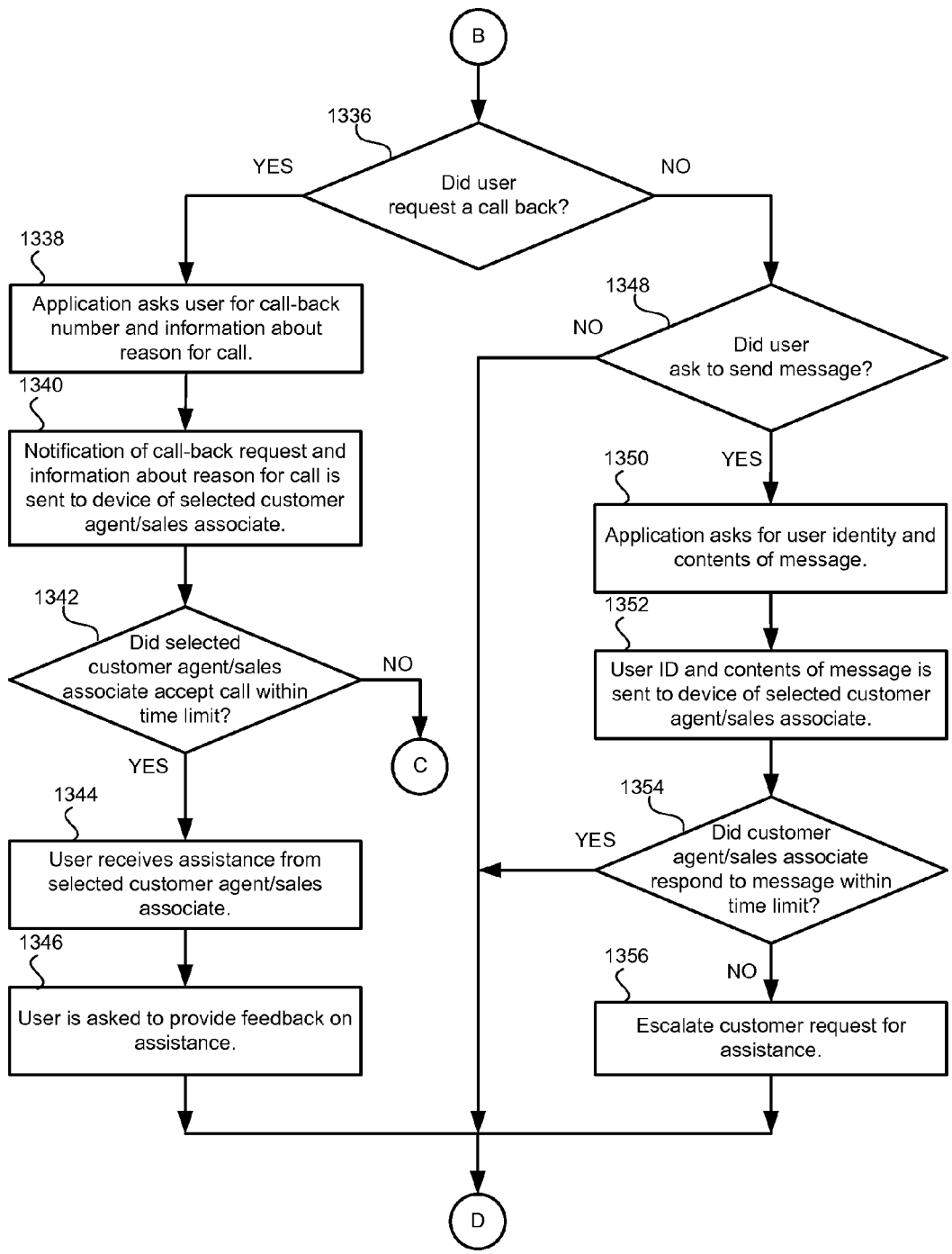

FIG. 13C illustrates further actions of the method of providing customer assistance which continue from FIG. 13B, in accordance with a representative embodiment of the present invention. At block 1336, the method determines whether the user requested a call back from the customer-selected customer service agent. If it is determined, at block 1336, that the user did request a call-back, the method continues at block 1338, where the user is asked to provide a call-back number and information regarding the reason for the call. If the reasons for the request for assistance relates to a product, the customer may, for example, be permitted to include in the request a scan of a product identifier such as a Universal Product Code (UPC), a "QR" code, or a picture of a product. Then, at block 1340, the method sends notification of the call back request and the information regarding the reason for the call to the customer-selected customer service agent. Such a notification may be sent via any suitable communication path to a handheld/mobile communication device or PC of the customer service agent. While waiting for a response to the request for assistance, the customer may be able to select materials to listen to or view video materials related to their request, related to products or services of interest (e.g., based on customer purchase history information or prior requests for assistance). In a representative embodiment of the present invention, a determination may later be made, as at block 1342, as to whether the customer-selected customer service agent responds to the request within a certain amount of time (e.g., the certain amount of time shown in the screen 1200A of FIG. 12A). If the customer-selected customer services agent does respond within the allotted time, the customer then, at block 1344, receives the requested assistance via a call-back from the customer-selected customer service agent.

In a representative embodiment of the present invention, the interaction between the customer and the customer service agent may be in any of a variety of modes including, for example, a voice call, a video call, text messaging (a.k.a., Short Message Service (SMS) or Multimedia Messaging Services (MMS), email, or any other suitable communication means. In the case of video communication, the customer service agent may arrange to sent to the customer video images of a product or of product details, and/or video clips and other video materials, as part of their efforts to assist the customer. For example, the customer service agent may arrange to play a product overview video to a customer asking questions about a particular product that they are considering for purchase, or the customer service agent may transmit live video from the sales floor of a product in which the customer has expressed interest, or is having a problem operating. If the customer service agent feels that someone with greater technical knowledge is needed, the customer service agent may choose to engage technical experts in the interaction with the customer, seamlessly, as part of a single call session, to enable the customer to have the benefit of the experience and greater support available from those with more detailed product technical knowledge. If communication using video is not available, the customer service agent may respond to a customer request for information by sending still images of product details captured on the sales floor, or from instruction manuals, advertisements, or other materials available to the customer service agent. The customer service agent may identify the customer request as related to a frequently raised issue or question, and may access and forward to the customer a response taken partially or in whole from a database of frequently asked questions (FAQs).

Prior to or during the interaction, the customer service agent may be sent detailed information about the customer requesting assistance including, for example, favorite brands or products, the current contents of their "shopping cart" and inventory information for the selected products if the request for assistance occurred while shopping via e-commerce (e.g., either in-store or online), and historical information about customer purchase and interactions of the customer with various customer interfaces. The detailed information about the customer may also include information about any prior requests that were not resolved, a customer rating (e.g., "VIP"), coupons code for which the customer is currently eligible, and any information gathered by other customer service agents with whom the customer has interacted, whether human or virtual. Such information may be automatically presented to the responding customer service agent via a handheld or mobile device, such as those described above, prior to accepting the request for assistance, to enable the customer service agent to gather relevant information in order to be more knowledgeable and better prepared to efficiently assist the customer with the needed help.

In addition, the customer service agent may create a "product catalog" on behalf of the customer, adding products discussed with the customer, or products that the customer service agent feels would be of interest, and may send to the customer a copy of the "product catalog" or the information needed to allow the customer to gain access to the "product catalog." The customer may then open the "product catalog" at their convenience via a smart phone, tablet computer, or laptop or desktop PC to review the listed products, and make any desired purchases.

Following the interaction between the customer and the customer service agent, the method of FIGS. 13A-13D may collect feedback from the customer regarding the assistance provided by the customer service agent. In addition, the customer service agent, or a system such as the host system server 68, discussed above, may send to the customer, information about the products/services discussed by the customer and customer service agent, as part of a "recap" of their interaction. The method then ends. If however, at block 1342, the customer service agent fails to respond within the allotted time to the customer request for assistance, the method continues on at block 1358 of FIG. 13D.

If, however, the method determines, at block 1336, that the customer did not request a call-back, a determination is made, at block 1348, whether the customer asked to send a message to the customer-selected customer service agent. If the customer did not request to transmit a message to the customer service agent, the method of FIGS. 13A-13D ends. If, however, the method determines, at block 1348, that the customer did request transmission of a message to the customer-selected customer service agent, the method then, at block 1350, requests the customer to provide the contents of the message to be sent, and to provide information that identifies the customer. The method then, at block 1352, transmits the message and the customer identity information to the customer-selected customer service agent using any suitable communication path to the handheld/mobile communication device or PC of the customer service agent selected by the customer. At some later point in time, a determination is made, at block 1354, as to whether the customer-selected customer service agent responded within an allotted amount time to the customer message requesting assistance (e.g., within the amount of time shown on the screens 1200A, 1200B of FIG. 12A and FIG. 12B). If it is determined that the customer service agent did reply in the timeframe promised, the method of FIGS. 13A-13D ends. If, however, the customer service agent failed to respond in the timeframe promised, the method may then, at block 1356, escalate the customer request for assistance by, for example, sending the customer message requesting assistance to a centralized customer care or support center, and management may automatically be notified.

Figure 13D:
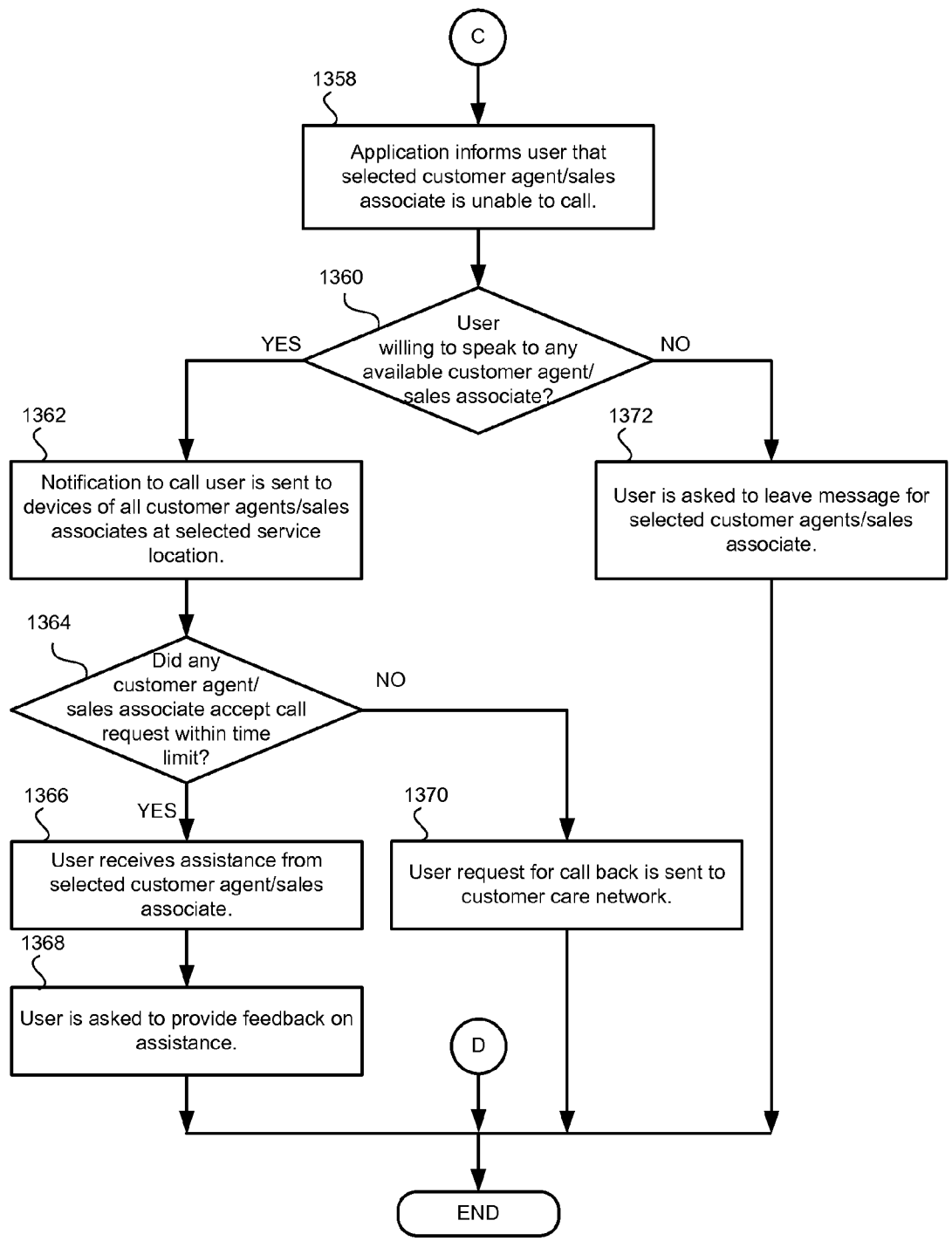

FIG. 13D illustrates the remaining actions of the method of providing customer assistance, in accordance with a representative embodiment of the present invention. The actions illustrated in FIG. 13D continue from block 1342 of FIG. 13C. If, at block 1342, the method determines that the customer-selected customer service agent did not respond within the certain amount of time for a call-back, the system performing the method, at block 1358, informs the customer that the customer-selected customer service agent is unable to respond to their request for a call-back. Next, at block 1360, a determination is made whether the customer is willing to speak with a customer service agent other than the one selected. If it is determined that the customer is not willing to speak to a customer service agent other than the one selected, the customer is then asked, at block 1372, to leave a message for the customer-selected customer service agent.

If, however, it is determined, at block 1360, that the customer is willing to speak to a customer service agent other that the one he/she selected, a message requesting a call-back to the customer is sent, at block 1362, to other customer service agents at the customer-selected business/service location. At some later point in time, a determination is made, at block 1364, whether any customer service agent accepted the customer request for a call-back within an allotted amount of time. If it is determined, at block 1364, that no customer service agent responded within the allotted time, then the customer request for a call back is forwarded, at block 1370, to a customer care network that may or may not be located at or near the business/service location selected by the customer. In some representative embodiments of the present invention, the customer may be connected to a "virtual customer service agent" that may use artificial intelligence techniques to interact with the customer in an attempt to gain additional details about the reason for the customer request for assistance, any products or services that may be involved, the urgency of the request, and best ways and times to be contacted by the customer-selected customer service agent, or another available customer service agent. Such a "virtual customer service agent" may be available, for example, in a audio/video session, or a voice-only session. Following such a use of an automated "virtual customer service agent," the customer may be polled for feedback, to determine their feelings about the use of such technology, its effectiveness in identifying the reasons for the request, the issues involved in the request, and the customer's satisfaction with any actions to be taken. The information collected by the "virtual customer service agent" may be forwarded to the customer service agent that ultimately responds to the customer request for assistance, to enable them to research any issues raised, find details about any products or services that were identified by the customer, and review the customer purchase history and past contacts with the customer assistance organization.

If it is determined, at block 1364, that a customer service agent other than that selected by the customer at the customer-selected business/service location did respond to the customer request for a call-back, then, at block 1366, the call-back to provide the requested assistance is placed to the customer by the responding customer service agent. In addition, the customer service agent or a system such as the host system server 68, previously discussed, may send to the customer, information about the products/services discussed as part of a "recap" of the interaction. Following completion of the requested assistance, the customer maybe requested, at block 1368, to provide feedback on the assistance received. The method of FIGS. 13A-13D then ends.

Although the representative embodiments of the present invention discussed above with respect to FIGS. 8-13D may relate to a customer employing a software application on a user device such as a mobile or handheld electronic device or PC to request assistance in the form of voice or video call-back or text, email, or social network messaging between a customer and a customer-selected customer service agent, the present invention is not necessarily limited to that one example embodiment. Such functionality may also be provided by a system such as the host system server 68, discussed above, serving a web site accessed via the Internet using a web browser on a smart phone, handheld computer, tablet computer, desktop computer, or any other suitable other electronic device.

In addition, it should be noted that the example screens discussed above may include additional graphical user interface (GUI) elements, or may exclude some of those GUI elements shown in FIGS. 8-12B, and may arrange the GUI elements used in different arrangements, for use on the same or a different user device, without departing from the spirit and scope of the present invention.

In a representative embodiment of the present invention, a system such as the host system server 68, previously discussed, may include, or may be communicatively coupled to, a communication platform that supports communication between a user/customer and a customer service agent in any of a number of media forms including, for example, voice originating/terminating at a user terminal on a switched circuit or packet wireless or wired network, one or two-way video communication over a communication path including one or both of wired and wireless links, and text messaging. Such a communication platform may also support the conversion between forms of communication including, for example, text and voice.

The communication between the user and a customer service representative may be established as an immediate voice call, video call, or exchange of messages between the user and the selected customer service agent.

Figure 14:
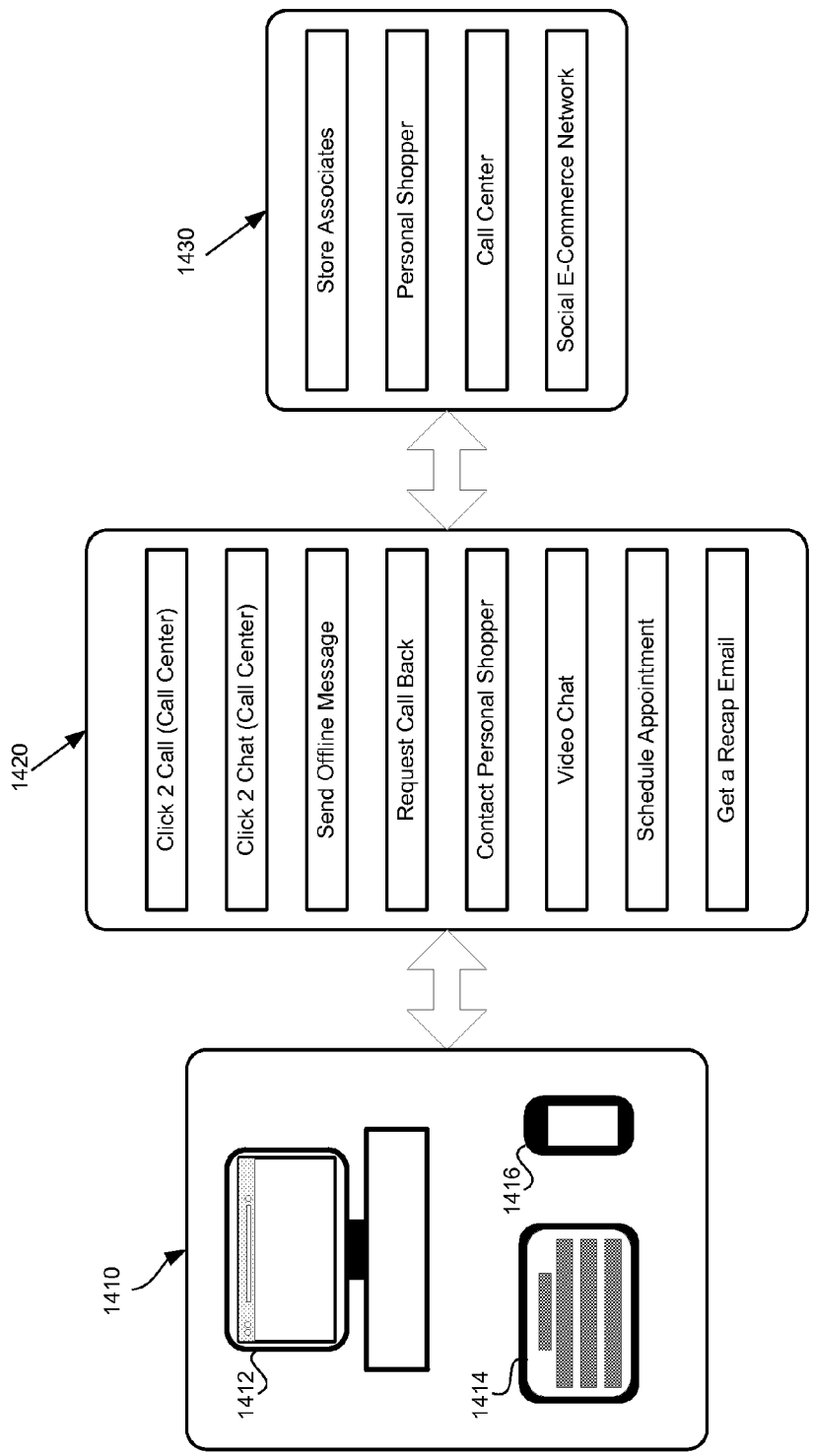
FIG. 14 shows a block diagram that provides an overview of the various forms of communication functionality that may be made available in order to enable a customer using any of a number of customer devices to receive assistance by various members of a customer support network, in accordance with a representative embodiment of the present invention.

FIG. 14 shows a block diagram that provides an overview of the various forms of communication functionality 1420 that may be made available in order to enable a customer using any of a number of customer devices 1310 to receive assistance by various members of a customer support network 1430, in accordance with a representative embodiment of the present invention. As shown in FIG. 14, the customer use any of a number of different communications devices including, for example, a desktop personal computer 1412, a tablet computer 1414, and a smart phone 1416 to request assistance from a the customer service agents or sales associates of a business operator, personal shoppers, members of the support staff at a call center, individuals that make up the social networks of the customer, and members of a social e-commerce network that may be associated with a business operating or sponsoring a e-commerce platform or system such as may be part of the host system server 68, discussed above, for example.

In one instance, customer access to help may be accomplished through the use of, for example, a web browser in the PC 1412, the tablet computer 1414, or the smart phone 1416 communicating over the Internet with a software application running on a web server. The web server may, for example, be part of a system such as the host system server 68. In another instance, customer access to help may be through the use of a software application running on a user device such as the tablet computer 1414 or the smart phone 1416 of FIG. 14 interacting via a wireless wide-area network (e.g., cellular, WiMAX, or other suitable wireless network) or local-area network (e.g., IEEE 802.11a/b/g/n/ac network) with the host system server 68.

The communication functionality 1420 of FIG. 14 of a representative embodiment of the present invention enables the customer to receive assistance from the members of the customer support network 1430 in a wide variety of modes. Functionality to support assisting the customer may include, for example, "Click 2 Call" voice mode access to a call center or customer support center, "Click 2 Chat" text mode (chat) messaging to a call center or customer support center, a "Send Offline Message" mode to permit contact with offline customer service agents. In addition, a representative embodiment of the present invention may include "Request Call-Back" functionality to enable the customer to request a call back from an online customer service agent, a "Contact Personal Shopper" capability to request that a "personal shopper" be provided to give assistance in product/service selection. The functionality provided may also include "Video Chat" capability to enable a customer to use video communication to interact with any of customer service agents, personal shoppers, members of their social network, friends, and family. The functionality of a representative embodiment of the present invention may also include the ability to schedule an appointment with customer service agents or personal shoppers, and to get a recapitulation or "recap" of interactions with individuals such as, for example, customer service agents, support members at a call center or customer support center, and personal shoppers. Such a "recap" may include, for example, information about any products and/or services discussed including links to product pages, special offers extended to the customer by the customer service agent or personal shopper, recommendations, and reviews.

Aspects of the present invention may be found in a method of providing assistance to a customer. Such a method may comprise receiving a request for assistance from a customer of a business, via a communication device of the customer, and in response to the request, determining a location of the communication device of the customer. The method may also comprise identifying, to the customer via the communication device of the customer, one or more locations of the business within a certain distance of the determined location of the communication device of the customer, and accessing information about one or more customer service agents for a business location selected by the customer. In addition, the method may comprise presenting, to the customer via the communication device of the customer, the information about the one or more customer service agents and their availability.

In a representative embodiment of the present invention, the method may comprise, responsive to selection by the customer of one customer service agent from the one or more customer service agents, notifying the one customer service agent of customer initiation of communication between the customer and the one customer service agent, where notifying may comprise sending to a communication device of the one customer service agent a request to contact the customer. In addition, notifying may comprise determining whether the one customer service agent accepts the request to contact the customer, within a certain amount of time, and determining whether the one customer service agent accepts the request to contact the customer within a certain amount of time may comprise notifying another customer service agent of the request for assistance, if the one customer service agent did not accept, within the certain amount of time, the request to contact the customer.

Some representative embodiments of the present invention may comprise tracking current availability of a plurality of customer service agents to participate in communication with customers via a communication device of each of the plurality of customer service agents, where the communication device of each of the plurality of customer service agents may comprise one of a smart phone and a tablet computer. In a representative embodiment of the present invention, the communication device of the customer may comprise one of a smart phone and a tablet computer. Accessing information about one or more customer service agents for a business location selected by the customer may use customer input identifying a desired department at the business location. In a representative embodiment of the present invention, the request for assistance may comprise a message requesting a call from the customer service agent to the customer, and determining a location of a communication device of the customer may comprise determining whether the communication device of the customer is at a location of the business.

Further aspect of the present invention may be seen in a non-transient computer-readable medium having stored thereon a plurality of instructions executable by a processor, the instructions to cause the processor to perform actions of the method of providing assistance to a customer, as described above.

Yet additional aspects of the present invention may be observed in a system for providing assistance to a customer, the system comprising at least one processor for communicatively coupling to communication devices of customers and customer service agents of a business, where the at least one processor is operable to perform the actions of the method described above.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method of providing assistance to a customer, the method comprising:
   receiving a request for human assistance from a customer of a business having a plurality of business locations, via a communication device of the customer;
   in response to the request, requesting a location of the customer;
   identifying, to the customer via the communication device of the customer, those business locations, of the plurality of business locations, that are within a certain distance of the location of the customer;
   receiving, from the customer via the communication device of the customer, a selection of a particular business location from the plurality of business locations within the certain distance of the location of the customer;
   accessing information about each of a plurality of customer service agents located at the particular business location selected by the customer;
   presenting, to the customer via the communication device of the customer, the information about the plurality of customer service agents and their current availability to interact with the customer;
   receiving, from the customer, a request to interact with a particular customer service agent selected by the customer from the plurality of customer service agents at the particular business location selected by the customer; and
   sending a notification of the customer request to interact, to a communication device of the particular customer service agent.

2. The method according to claim 1, the method comprising:
   responsive to selection by the customer of the particular customer service agent from the plurality of customer service agents, notifying the particular customer service agent of customer initiation of communication between the customer and the particular customer service agent.

3. The method according to claim 2, wherein notifying comprises sending to the communication device of the particular customer service agent a request to contact the customer.

4. The method according to claim 3, wherein notifying comprises determining whether the particular customer service agent accepts the request to contact the customer, within a certain amount of time.

5. The method according to claim 4, wherein determining whether the particular customer service agent accepts the request to contact the customer within a certain amount of time comprises notifying another customer service agent of the request for assistance, if the particular customer service agent did not accept, within the certain amount of time, the request to contact the customer.

6. The method according to claim 1, the method comprising:
   tracking current availability of the plurality of customer service agents to participate in communication with customers via a communication device of each of the plurality of customer service agents.

7. The method according to claim 6, wherein the communication device of each of the plurality of customer service agents comprises one of a smart phone and a tablet computer.

8. The method according to claim 1, wherein the communication device of the customer comprises one of a smart phone and a tablet computer.

9. The method according to claim 1, wherein accessing information about the plurality of customer service agents for the particular business location selected by the customer uses customer input identifying a desired department at the particular business location.

10. The method according to claim 1, wherein the request for assistance comprises a message requesting a call from the customer service agent to the customer.

11. The method according to claim 1, wherein determining requesting a location of the customer comprises determining whether the communication device of the customer is at a location of the business.

12. A non-transient computer readable medium having stored thereon a plurality of instructions executable by a processor, the instructions to cause the processor to perform actions of a method of providing assistance to a customer, the actions comprising:
   receiving a request for human assistance from a customer of a business having a plurality of business locations, via a communication device of the customer;
   in response to the request, requesting a location of the customer;
   identifying, to the customer via the communication device of the customer, those business locations, of the plurality of business locations, that are within a certain distance of the location of the customer;
   receiving, from the customer via the communication device of the customer, a selection of a particular business location from the plurality of business locations within the certain distance of the location of the customer;
   accessing information about each of a plurality of customer service agents located at the particular business location selected by the customer;
   presenting, to the customer via the communication device of the customer, the information about the plurality of customer service agents and their current availability to interact with the customer;
   receiving, from the customer, a request to interact with a particular customer service agent selected by the customer from the plurality of customer service agents at the particular business location selected by the customer; and
   sending a notification of the customer request to interact, to a communication device of the particular customer service agent.

13. The non-transient computer readable medium according to claim 12, wherein the instructions cause the processor to perform actions comprising:
   responsive to selection by the customer of the particular customer service agent from the plurality of customer service agents, notifying the particular customer service agent of customer initiation of communication between the customer and the particular customer service agent.

14. The non-transient computer readable medium according to claim 13, wherein notifying comprises sending to the communication device of the particular customer service agent a request to contact the customer.

15. The non-transient computer readable medium according to claim 14, wherein notifying comprises determining whether the particular customer service agent accepts the request to contact the customer, within a certain amount of time.

16. The non-transient computer readable medium according to claim 15, wherein determining whether the particular customer service agent accepts the request to contact the customer within a certain amount of time comprises notifying another customer service agent of the request for assistance, if the particular customer service agent did not accept, within the certain amount of time, the request to contact the customer.

17. The non-transient computer readable medium according to claim 12, the instructions causing the processor to perform actions comprising:
   tracking current availability of the plurality of customer service agents to participate in communication with customers via a communication device of each of the plurality of customer service agents.

18. The non-transient computer readable medium according to claim 17, wherein the communication device of each of the plurality of customer service agents comprises one of a smart phone and a tablet computer.

19. The non-transient computer readable medium according to claim 12, wherein the communication device of the customer comprises one of a smart phone and a tablet computer.

20. The non-transient computer readable medium according to claim 12, wherein accessing information about the plurality of customer service agents for the particular business location selected by the customer uses customer input identifying a desired department at the particular business location.

21. The non-transient computer readable medium according to claim 12, wherein the request for assistance comprises a message requesting a call from the customer service agent to the customer.

22. The non-transient computer readable medium according to claim 12, wherein requesting a location of the customer comprises determining whether the communication device of the customer is at a location of the business.

23. A system for providing assistance to a customer, the system comprising:
   at least one processor for communicatively coupling to communication devices of customers and customer service agents of a business having a plurality of business locations, the at least one processor operable to, at least:
      receive a request for human assistance from a customer of the business, via a communication device of the customer;
      in response to the request, request a location of the customer;
      identify, to the customer via the communication device of the customer, those business locations, of the plurality of business locations within a certain distance of the location of the customer;
      receive, from the customer via the communication device of the customer, a selection of a particular business location from the plurality of business locations within the certain distance of the location of the customer;
      access information about each of a plurality of customer service agents located at the particular business location selected by the customer;
      present, to the customer via the communication device of the customer, the information about the plurality of customer service agents and their current availability to interact with the customer;
   receive, from the customer, a request to interact with a particular customer service agent selected by the customer from the plurality of customer service agents at the particular business location selected by the customer; and
   send a notification of the customer request to interact, to a communication device of the particular customer service agent.

* * * * *